United States Patent
Kol et al.

(10) Patent No.: US 9,787,377 B2
(45) Date of Patent: Oct. 10, 2017

(54) MUTUAL WLAN AND WAN INTERFERENCE MITIGATION IN UNLICENSED SPECTRUM

(71) Applicant: QUALCOMM Incorporated, San Diego, CA (US)

(72) Inventors: Boaz Kol, Hod-Hasharon (IL); Assaf Touboul, Natanya (IL); Aaron Elazar Klein, Highland Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 457 days.

(21) Appl. No.: 14/574,281

(22) Filed: Dec. 17, 2014

(65) Prior Publication Data

US 2016/0182134 A1    Jun. 23, 2016

(51) Int. Cl.
| | |
|---|---|
| *H04B 7/0456* | (2017.01) |
| *H04L 25/02* | (2006.01) |
| *H04W 72/08* | (2009.01) |
| *H04J 11/00* | (2006.01) |
| *H04L 25/03* | (2006.01) |
| *H04B 1/7107* | (2011.01) |

(Continued)

(52) U.S. Cl.
CPC ......... *H04B 7/0456* (2013.01); *H04B 1/7107* (2013.01); *H04B 7/0891* (2013.01); *H04J 11/0023* (2013.01); *H04L 25/021* (2013.01); *H04L 25/0328* (2013.01); *H04W 72/082* (2013.01); *H04W 88/06* (2013.01)

(58) Field of Classification Search
CPC .. H04B 7/0456; H04B 7/0891; H04B 1/7107; H04L 25/021; H04L 25/0328; H04L 11/0023; H04W 72/082; H04W 88/06
See application file for complete search history.

(56) References Cited

U.S. PATENT DOCUMENTS

| | | | |
|---|---|---|---|
| 8,676,144 B2 | 3/2014 | Guo et al. | |
| 2003/0042403 A1* | 3/2003 | Joshi | H01L 31/173 |
| | | | 250/214.1 |

(Continued)

OTHER PUBLICATIONS

International Search Report and Written Opinion—PCT/US2015/062447—ISAEPO—May 2, 2016. (14 total pages).

(Continued)

*Primary Examiner* — Mohammad Anwar
(74) *Attorney, Agent, or Firm* — Arent Fox, LLP

(57) ABSTRACT

The disclosure provides for interference mitigation for wireless signals in unlicensed spectrum. A wireless device may receive a combined signal including a first radio access technology (RAT) signal and a second RAT signal. The wireless device may generate, using a first RAT receiver in a first processing path, a channel estimate for the first RAT signal based on a previously decoded signal of the first RAT. The wireless device may reduce interference to the second RAT signal caused by the first RAT signal, in a second processing path, using the channel estimate. The wireless device may further decode the second RAT signal. The wireless device may remodulate the decoded signal using a transmitter to generate a remodulated second RAT signal. The remodulated second RAT signal may be canceled from the combined signal. The wireless device may decode a remaining portion of the combined signal including the first RAT signal.

28 Claims, 11 Drawing Sheets

(51) Int. Cl.
*H04B 7/08* (2006.01)
*H04W 88/06* (2009.01)

(56) References Cited

U.S. PATENT DOCUMENTS

| | | | |
|---|---|---|---|
| 2008/0025200 A1* | 1/2008 | Tiirola | H04L 5/023 370/210 |
| 2008/0043827 A1* | 2/2008 | Renfors | H04B 3/14 375/230 |
| 2008/0125154 A1* | 5/2008 | Zirwas | H04B 7/022 455/501 |
| 2009/0088116 A1 | 4/2009 | Nam et al. | |
| 2009/0310724 A1 | 12/2009 | Shah et al. | |
| 2010/0040178 A1 | 2/2010 | Sutton et al. | |
| 2012/0113837 A1* | 5/2012 | Siomina | H04W 24/10 370/252 |
| 2013/0115988 A1* | 5/2013 | Sun | H04J 11/0056 455/501 |
| 2013/0195166 A1 | 8/2013 | Reial | |
| 2013/0242885 A1 | 9/2013 | Zhu et al. | |
| 2014/0051378 A1 | 2/2014 | Daneshrad et al. | |
| 2014/0073257 A1 | 3/2014 | Tujkovic et al. | |

OTHER PUBLICATIONS

NTT DOCOMO: "Inter-Operator and Inter-RAT Co-existence Techniques for LAA using LTE," 3GPP Draft; R1-144339 Inter-Operator and Inter-RAT Co-existence Techniques for LAA using LTE Final, 3rd Generation Partnership Project (3GPP), Mobile Competence Centre; 650, Route Des Lucioles; F-06, vol. RAN WG1, No. Ljubljana, Slovenia; 20141006-20141010, Oct. 9, 2014 (Oct. 9, 2014), XP050885136, Retrieved from the Internet: URL: http://www.3gpp.org/ftp/tsg_ran/wg1_rl1/tsgr1_78b/docs/ [retrieved on Oct. 9, 2014], Sections 1 and 2.

* cited by examiner

MUTUAL WLAN AND WAN INTERFERENCE MITIGATION IN UNLICENSED SPECTRUM

BACKGROUND

Aspects of the present disclosure relate generally to wireless communications, and more particularly, to techniques for interference mitigation in unlicensed spectrum.

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of evolved nodeBs (eNodeBs) that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

To supplement conventional base stations, additional restricted power or restricted coverage base stations, referred to as small coverage base stations or cells, can be deployed to provide more robust wireless coverage to mobile devices. For example, wireless relay stations and low power base stations (e.g., which can be commonly referred to as Home NodeBs or Home eNodeBs, or referred to as femto cells, pico cells, etc.) can be deployed for incremental capacity growth, richer user experience, in-building or other specific geographic coverage, and/or the like. Such low power or small coverage (e.g., relative to macro network base stations or cells) base stations can be connected to the Internet via broadband connection (e.g., digital subscriber line (DSL) router, cable or other modem, etc.), which can provide the backhaul link to the mobile operator's network. Thus, for example, the small coverage base stations can be deployed in user homes to provide mobile network access to one or more devices via the broadband connection. Because deployment of such base stations is unplanned, low power base stations can interfere with one another where multiple stations are deployed within a close vicinity of one another.

Operation of wireless devices in certain portions of a shared or unlicensed spectrum may experience interference from another radio access technology (RAT) using the spectrum. For example, both long term evolution (LTE) and Wi-Fi may operate in an unlicensed 5 GHz band. Interference from the second RAT on a signal of the first RAT may degrade the signal quality of the first RAT. In view of the foregoing, it may be understood that mitigation of interference in shared spectrum is desirable.

SUMMARY OF THE DISCLOSURE

Various aspects are now described with reference to the drawings. In the following description, for purposes of explanation, numerous specific details are set forth in order to provide a thorough understanding of one or more aspects. It may be evident, however, that such aspects may be practiced without these specific details. The following presents a simplified summary of one or more aspects in order to provide a basic understanding of such aspects.

The disclosure provides for interference mitigation for wireless signals in unlicensed spectrum. A wireless device may receive a combined signal including a first radio access technology (RAT) signal and a second RAT signal. The wireless device may generate, using a first RAT receiver in a first processing path, a channel estimate for the first RAT signal based on a previously decoded signal of the first RAT. The wireless device may reduce interference to the second RAT signal caused by the first RAT signal, in a second processing path, using the channel estimate. The wireless device may further decode the second RAT signal. The wireless device may remodulate the decoded signal using a transmitter to generate a remodulated second RAT signal. The remodulated second RAT signal may be canceled from the combined signal. The wireless device may decode a remaining portion of the combined signal including the first RAT signal.

In an aspect, the disclosure provides a method for interference mitigation for wireless signals. The method may include receiving a combined signal including a first RAT signal and a second RAT signal. The method may further include generating, by a first RAT receiver in a first processing path, a channel estimate for the first RAT signal based on a previously decoded signal of the first RAT. The method may also include reducing interference to the second RAT signal caused by the first RAT signal, in a second processing path, using the channel estimate.

In another aspect, the disclosure provides an apparatus for interference mitigation for wireless signals. The apparatus may include means for receiving a combined signal including a first RAT signal and a second RAT signal. The apparatus may further include means for generating, in a first processing path, a channel estimate for the first RAT signal based on a previously decoded signal of the first RAT. The apparatus may also include means for reducing, in a second processing path, interference to the second RAT signal caused by the first RAT signal using the channel estimate.

The disclosure also provides another apparatus for interference mitigation for wireless signals. The apparatus may include antennas configured to receive a combined signal including a first RAT signal and a second RAT signal. The apparatus may further include a first RAT receiver, in a first processing path, configured to generate a channel estimate for the first RAT signal based on a previously decoded signal of the first RAT. The apparatus may also include a second RAT receiver, in a second processing path, configured to use the channel estimate to improve the second RAT signal by reducing interference caused by the first RAT signal to the second RAT signal.

In an aspect, the disclosure provides a computer readable medium storing computer executable code. The computer-readable medium may be non-transitory. The computer readable medium may include instructions for receiving a combined signal including a first radio access technology (RAT) signal and a second RAT signal. The computer-readable medium may further include instructions for generating, by a first RAT receiver in a first processing path, a channel estimate for the first RAT signal based on a previously decoded signal of the first RAT. The computer-readable medium may also include instructions for reducing interference to the second RAT signal caused by the first RAT signal, in a second processing path, using the channel estimate.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

DETAILED DESCRIPTION

Figure 1:
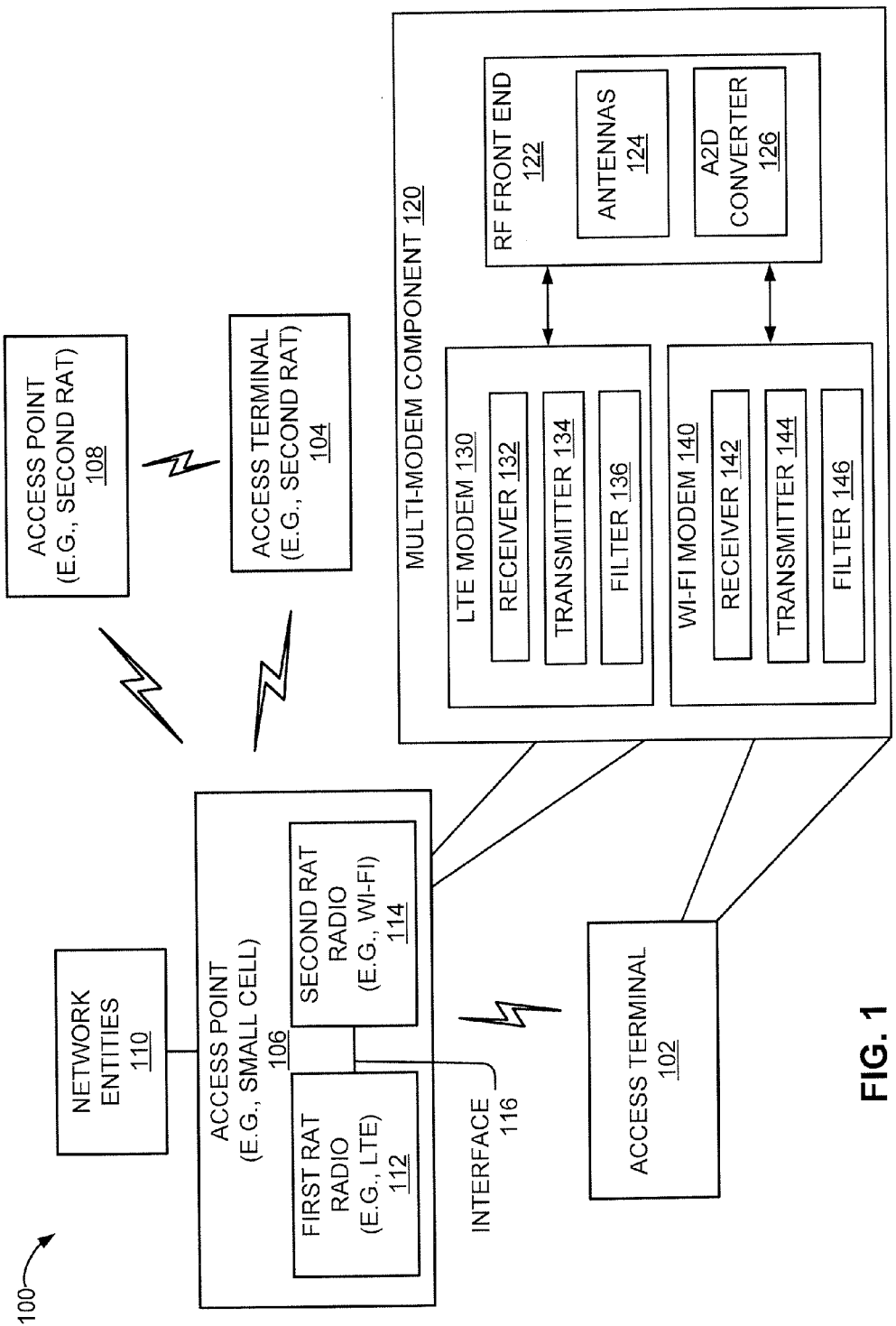
FIG. 1 is a block diagram illustrating an example of a telecommunications system in accordance with an aspect of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

A wireless device operating in shared unlicensed spectrum may be configured to receive signals from two or more RAT types. For example, a wireless device may be configured to receive both an LTE signal and a Wi-Fi signal. The wireless device may have modem components for processing the signals depending on a desired signal type. In an aspect, the modem components for two RAT types may be closely coupled such that the modem components may share information useful for reducing interference to one or more received signals.

In an aspect, a wireless device may use a receiver associated with a first RAT to generate a channel estimate for a first RAT signal. The channel estimate may then be used to reduce interference to a second RAT signal caused by the first RAT signal. The channel estimate provided by the receiver associated with the first RAT may accurately predict channel conditions based on timing and feedback information of the first RAT network. Interference to the second RAT signal may be reduced by nulling the first RAT signal based on the channel estimate, selectively combining multiple streams using weights based on the channel estimate, and/or cancelling a first RAT signal from the second RAT signal. The first RAT signal may also be improved by cancelling the second RAT signal from the first RAT signal.

In order to facilitate a fuller understanding of the present disclosure, reference is now made to the accompanying drawings, in which like elements are referenced with like numerals. These drawings should not be construed as limiting the present disclosure, but are intended to be illustrative only.

FIG. 1 illustrates several nodes of a sample communications system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, Home NodeBs, Home eNodeBs, small cells, macro cells, femto cells, and so on, while access terminals may be referred to or implemented as user equipment (UEs), mobile stations, and so on.

As used herein, the term "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a base station (BS), an access point, a femto node, a femtocell, a pico node, a micro node, a Node B, evolved Node B (eNB), home Node B (HNB) or home evolved Node B (HeNB). Therefore, the term "small cell," as used herein, refers to a relatively low transmit power and/or a relatively small coverage area cell as compared to a macro cell.

The present disclosure relates in some aspects to techniques that facilitate concurrent reception and decoding of signals from two or more RAT types. For convenience, the use, operation, extension, and/or adaptation of LTE and/or LTE Advanced for applications in an unlicensed radio frequency (RF) band may be referred to herein as "LTE/LTE Advanced in unlicensed spectrum," "adapting LTE/LTE Advanced in unlicensed spectrum," "extending LTE/LTE Advanced to unlicensed spectrum," and "LTE/LTE Advanced communications over unlicensed spectrum" etc. Moreover, a network or device that provides, adapts, or extends LTE/LTE Advanced in unlicensed spectrum may refer to a network or device that is configured to operate in a contention-based radio frequency band or spectrum.

In an aspect, the communications system 100 may include various devices that may communicate using a shared portion of the spectrum. In one example, the shared portion of the spectrum may include an unlicensed portion of the spectrum. A shared portion of the spectrum may include any frequency band that, for example, allows usage by more than one technology or network. For example, devices may use a portion of a 5 GHz band, which may also be referred to as an unlicensed national information infrastructure (U-NII) radio band.

The system 100 may include access points 106, 108 that provide access to one or more services (e.g., network connectivity) for one or more wireless terminals (e.g., the access terminal 102 or the access terminal 104) that may be installed within or that may roam throughout a coverage area of the system 100. For example, at various points in time the access terminal 102 may connect to the access point 106 or some other access point in the system 100 such as access point 108. Similarly, the access terminal 104 may connect to the access point 106, access point 108, or some other access point.

One or more of the access points 106, 108 may communicate with one or more network entities 110 to facilitate wide area network connectivity. Two or more of such network entities may be co-located and/or two or more of such network entities may be distributed throughout a network.

A network entity 110 may take various forms such as, for example, one or more radio and/or core network entities. Thus, in various implementations the network entities 110 may represent functionality such as at least one of: network management (e.g., via an operation, administration, management, and provisioning entity), call control, session management, mobility management, gateway functions, interworking functions, or some other suitable network functionality. In some aspects, mobility management relates to: keeping track of the current location of access terminals through the use of tracking areas, location areas, routing areas, or some other suitable technique; controlling paging for access terminals; or providing access control for access terminals.

When the access point 106 (or any other devices in the system 100) uses a first RAT to communicate using a portion of spectrum, this communication may be subjected to interference from nearby devices (e.g., the access point 108 and/or the access terminal 104) that use a second RAT to communicate on that portion of spectrum. For example, communication by the access point 106 via LTE on a particular unlicensed RF band may be subject to interference from Wi-Fi devices operating on that band. For convenience, LTE on an unlicensed RF band may be referred to herein as LTE/LTE Advanced in unlicensed spectrum, or simply LTE in the surrounding context.

In some systems, LTE in unlicensed spectrum may be employed in a standalone configuration, with all carriers operating exclusively in an unlicensed portion of the wireless spectrum (e.g., LTE Standalone). In other systems, LTE in unlicensed spectrum may be employed in a manner that is supplemental to licensed band operation by providing one or more unlicensed carriers operating in the unlicensed portion of the wireless spectrum in conjunction with an anchor licensed carrier operating in the licensed portion of the wireless spectrum (e.g., LTE Supplemental DownLink (SDL)). In either case, carrier aggregation may be employed to manage the different component carriers, with one carrier serving as the Primary Cell (PCell) for the corresponding user equipment (UE) (e.g., an anchor licensed carrier in LTE SDL or a designated one of the unlicensed carriers in LTE Standalone) and the remaining carriers serving as respective Secondary Cells (SCells). In this way, the PCell may provide an FDD paired downlink and uplink (licensed or unlicensed), and each SCell may provide additional downlink capacity as desired.

In general, LTE utilizes orthogonal frequency division multiple access (OFDMA) on the downlink and single-carrier frequency division multiplexing (SC-FDM) on the uplink. OFDMA and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDMA and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

LTE may also use carrier aggregation. UEs (e.g., LTE-Advanced enabled UEs) may use spectrum of up to 20 MHz bandwidths allocated in a carrier aggregation of up to a total of 100 MHz (5 component carriers) used for transmission and reception. For the LTE-Advanced enabled wireless communication systems, two types of carrier aggregation (CA) methods have been proposed, continuous CA and non-continuous CA. Continuous CA occurs when multiple available component carriers are adjacent to each other. On the other hand, non-continuous CA occurs when multiple non-adjacent available component carriers are separated along the frequency band. Both non-continuous and continuous CA may aggregate multiple component carriers to serve a single unit of LTE-Advanced UEs.

In an aspect, an access terminal 102 and/or an access point 106 may be configured for communication using two or more RAT types. In an aspect, the access terminal 102 and/or access point 106 may include multi-modem component 120. In an aspect, the term "component" as used herein may be one of the parts that make up a system, may be hardware or software, and may be divided into other components. The multi-modem component 120 may integrate an RF front-end 122 and two or more RAT modems such as LTE modem 130 and Wi-Fi modem 140. In an aspect, the multi-modem component 120 may be formed on a single silicon die. In an aspect, the multi-modem component 120 may also be implemented on the single silicon die as a converged LTE and Wi-Fi modem having aspects implemented using software defined radio. The multi-modem component 120 may change the allocation of resources such as carriers, antennas, and computing resources among the two or more RATs. The multi-modem component 120 may also support multiple operating modes, for example, supporting backward compatibility with legacy protocols.

The RF front-end 122 may include hardware or means for receiving a combined RF signal. For example, the RF front-end 122 may include a plurality of distinct radio antennas 124. The antennas 124 may be spatially separated to provide receive diversity. In an aspect, the antennas 124 may include four receive antennas. The RF front-end 122 may further include other receive chain front-end components such as analog filters and an analog-to-digital (A2D) converter 126.

The LTE modem 130 may include hardware such as circuitry, a processor, memory, and/or other means for processing LTE signals. For example, the LTE modem 130 may be configured for processing signals for LTE in unlicensed spectrum. In an aspect, for example, the LTE modem 130 may include a receiver 132, a transmitter 134, and a filter 138.

The receiver 132 may be configured to receive and decode an LTE radio signal received from RF front-end 122. In an aspect, the receiver 132 may further be configured to generate a channel estimate for the LTE signal based on the decoded LTE signal. The receiver 132 may cross-correlate between a known data series of the LTE signal and the received signal in order to generate an initial channel estimation. The receiver 132 may also subsequently perform a smoothing operation in order to improve the accuracy of the estimation. In an aspect, the receiver 132 may provide an estimate for an LTE signal based on previously received information about the LTE signal. For example, the receiver 132 may decode timing information and other control information for the LTE signal. The channel estimate may be in the form of a vector $H_y$ for any given subcarrier. For example, the channel estimate $H_y$ may vary based on the frame structure and timing of the LTE signal. For example, the channel estimate for an LTE channel may remain constant for a duration of an LTE sub-frame.

The transmitter 134 may be configured to generate a modulated LTE signal based on digital input such as a MAC transport block. In an aspect, the transmitter 134 may receive digital input from a protocol stack of the wireless device such as access terminal 102 or access point 106. In another aspect, the transmitter 134 may receive digital input in the form of a demodulated received signal. The transmitter 134 may receive the demodulated received signal from the receiver 132 and remodulate the signal to produce a new LTE signal. In an aspect, the remodulated LTE signal may be used to configure a cancellation filter for improving a second RAT signal.

The filter 136 may include one or more digital filters configured to improve a signal quality of an incoming LTE signal. For example, the filter 136 may be a space-time filter configured to reduce interference from a second RAT signal. A space-time filter 136 may be configured based on a channel estimate provided by a second RAT receiver. In another aspect, the filter 136 may be a cancellation filter. A cancellation filter may be used to cancel a second RAT signal from the LTE signal. The cancellation filter may be configured based on a second RAT signal generated by a second RAT transmitter such as the transmitter 144.

The Wi-Fi modem 140 may include hardware configured to process Wi-Fi signals. In an aspect, for example, the Wi-Fi modem 140 may include a receiver 142, a transmitter 144, and a filter 148.

The Wi-Fi receiver 142 may be configured to receive and decode a Wi-Fi radio signal received from RF front-end 122. In an aspect, the receiver 142 may further be configured to generate a channel estimate for the Wi-Fi signal based on the decoded Wi-Fi signal. For example, the receiver 142 may decode a preamble of the Wi-Fi signal to determine timing information such as a transmission length and other control information such as occupied frequency band(s) for the Wi-Fi signal. The channel estimate may be in the form of a vector $H_x$ for any given time. In an aspect, the channel estimate $H_x$ may vary for each new incoming Wi-Fi transmission. In an aspect, the Wi-Fi receiver 142 may be configured for interference aware decoding of received signals. For example, the Wi-Fi receiver 142 may combine multiple input streams from the RF front-end 122 using weights based on a channel estimate of an interfering signal. For example, the Wi-Fi receiver 142 may use a channel estimate provided by the LTE receiver 132 to weight input streams.

The Wi-Fi transmitter 144 may be configured to generate a modulated Wi-Fi signal based on digital input such as a MAC transport block. In an aspect, the Wi-Fi transmitter 144 may receive digital input from a protocol stack of the wireless device such as access terminal 102 or access point 106. In another aspect, the transmitter 144 may receive digital input in the form of a demodulated received signal. The transmitter 144 may receive the demodulated received signal from the receiver 142. The transmitter 144 may remodulate the demodulated received signal to generate a new Wi-Fi signal. In an aspect, the new Wi-Fi signal may be used to configure a cancellation filter for improving a first RAT signal.

The filter 146 may include one or more digital filters configured to improve a signal quality of an incoming Wi-Fi signal. For example, the filter 146 may be a space-time filter configured to reduce interference from a first RAT type. A space-time filter 146 may be configured based on a channel estimate provided by a first RAT receiver. The space-time filter 146 may be configured as an LTE nuller to null out one or more LTE streams. In another aspect, the filter 146 may be a cancellation filter. A cancellation filter may be used to cancel a first RAT signal from the Wi-Fi signal. The cancellation filter may be configured based on a first RAT signal generated by a first RAT transmitter such as the transmitter 142.

Figure 2:
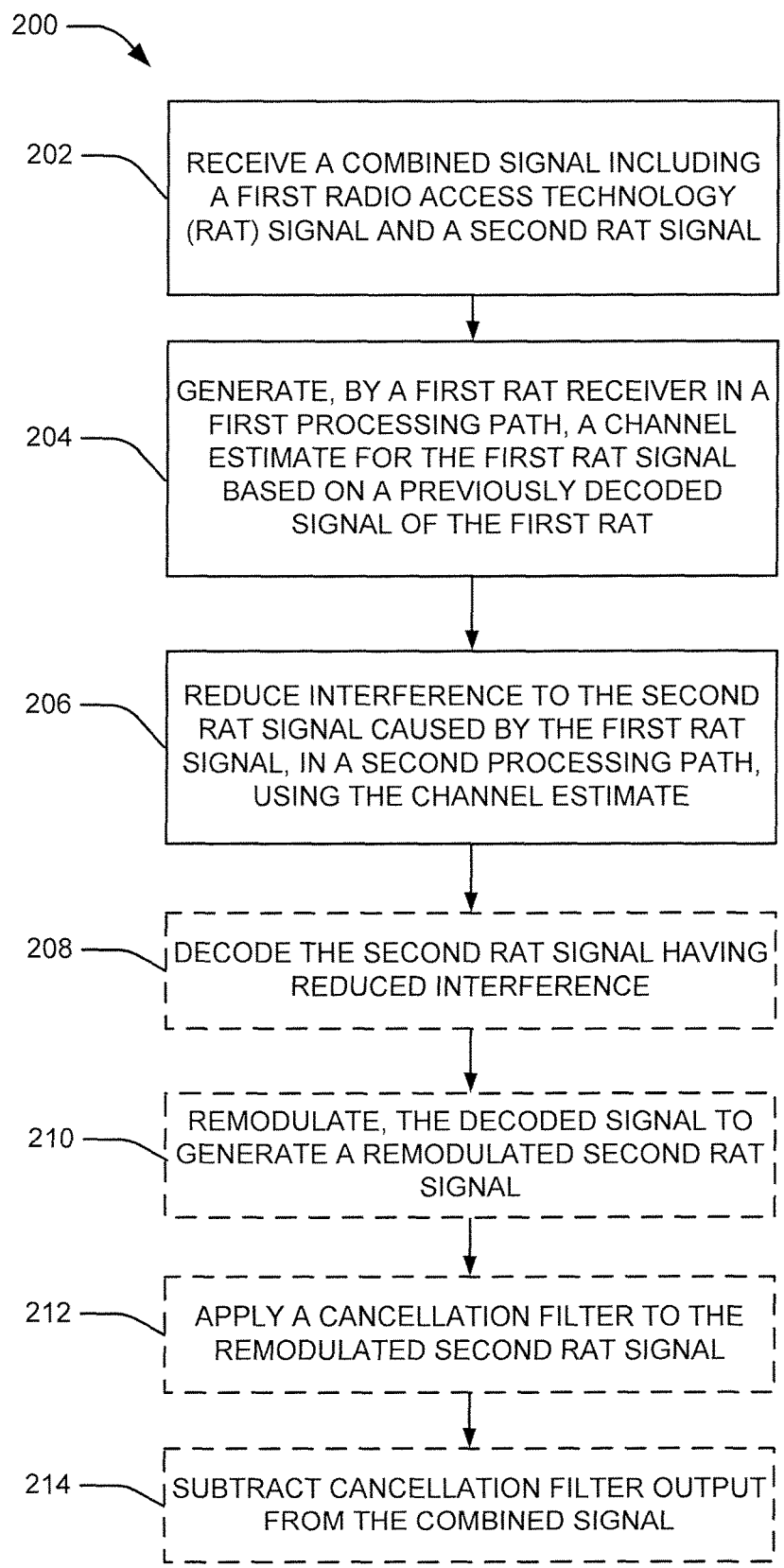
FIG. 2 is a flow diagram illustrating aspects of a method for concurrently transmitting during primary user detection.

FIG. 2 illustrates an example methodology 200 for interference mitigation for wireless signals. The methodology 200 may be performed by an access terminal 102 (FIG. 1) or an access point 106 (FIG. 1) including a multi-modem component 120 (FIG. 1).

In an aspect, at block 202, methodology 200 may include receiving a combined signal including a first RAT signal and second RAT signal. In an aspect, for example, the RF front-end 122 may receive a combined signal including a first RAT signal and second RAT signal. For example, the first RAT signal may be an LTE signal and the second RAT signal may be a Wi-Fi signal. The combined signal may further include noise such as additive Gaussian white noise (AGWN). The combined signal may be received by the antennas 124 as an analog signal. The combined signal may be received differently at each of the antennas 124 due to spatial diversity and possible multiple channel paths. The combined signal received at each of the antennas 124 may be sent to an analog-to-digital (A2D) converter 126. The A2D converter 126 may convert the received analog signal into a digital stream. The number of digital streams may correspond to the number of antennas 124.

In block 204, the methodology 200 may include generating, by a first RAT receiver in a first processing path, a channel estimate for the first RAT signal based on a previously decoded signal of the first RAT. In an aspect, for example, the LTE receiver 132 in a first processing path, may generate a channel estimate for the first RAT signal based on a previously decoded signal of the first RAT.

In block 206, the methodology 200 may include reducing interference to the second RAT signal caused by the first RAT signal, in a second processing path, using the channel estimate. In an aspect, for example, the Wi-Fi receiver 142 in a second processing path, may reduce interference to the second RAT signal caused by the first RAT signal using the channel estimate. In another aspect, for example, the filter 146 in a second processing path, may reduce interference to the second RAT signal caused by the first RAT signal using the channel estimate. In an aspect, reducing interference may include configuring a space-time filter in the second processing path based on the channel estimate and filtering a plurality of streams of the combined signal to null the first RAT signal. In another aspect, reducing interference may include weighting each of a plurality of streams of the combined signal using a covariance matrix based on the channel estimate and combining, by a second RAT receiver in the second processing path, the plurality of streams using the weighting. For example, the Wi-Fi receiver 142 may weight each stream of the plurality of streams of the combined signal using the inverse of a covariance matrix based on the channel estimate and combine the plurality of streams using the weighting. In another aspect, a whitening-filter may be generated from the inverse of the covariance matrix using Cholesky or some other square-root factorization.

In block 208, the methodology 200 may optionally include decoding, by a second RAT receiver in the second processing path, the second RAT signal having reduced interference. In an aspect, for example, the Wi-Fi receiver 142 may decode the second RAT signal having reduced interference.

In block 210, the methodology 200 may optionally include remodulating, by a second RAT transmitter, the decoded signal to generate a remodulated second RAT signal. In an aspect, for example, the Wi-Fi transmitter 144 may remodulate the second RAT signal to generate the remodulated second RAT signal. In an aspect, the remodulated second RAT signal may be a physical layer convergence protocol (PLCP) protocol data unit (PPDU)

In block 212, the methodology 200 may optionally include applying a cancellation filter to the remodulated second RAT signal. In an aspect, for example, the filter 146 (FIG. 1) may be applied to the remodulated second RAT signal. The cancellation filter 146 may be configured based on the remodulated second RAT signal to generate the opposite of the remodulated second RAT signal.

In block 214, the methodology may optionally include subtracting the output of the cancellation filter from the combined signal. In an aspect, for example, a combiner (e.g. combiner 320 in FIG. 3 or combiner 418 in FIG. 4) may subtract the output of the cancellation filter from the combined signal. In an aspect, the methodology 200 may further include decoding, by a first RAT receiver, a remaining portion of the combined signal after the second RAT signal is cancelled.

Figure 3:
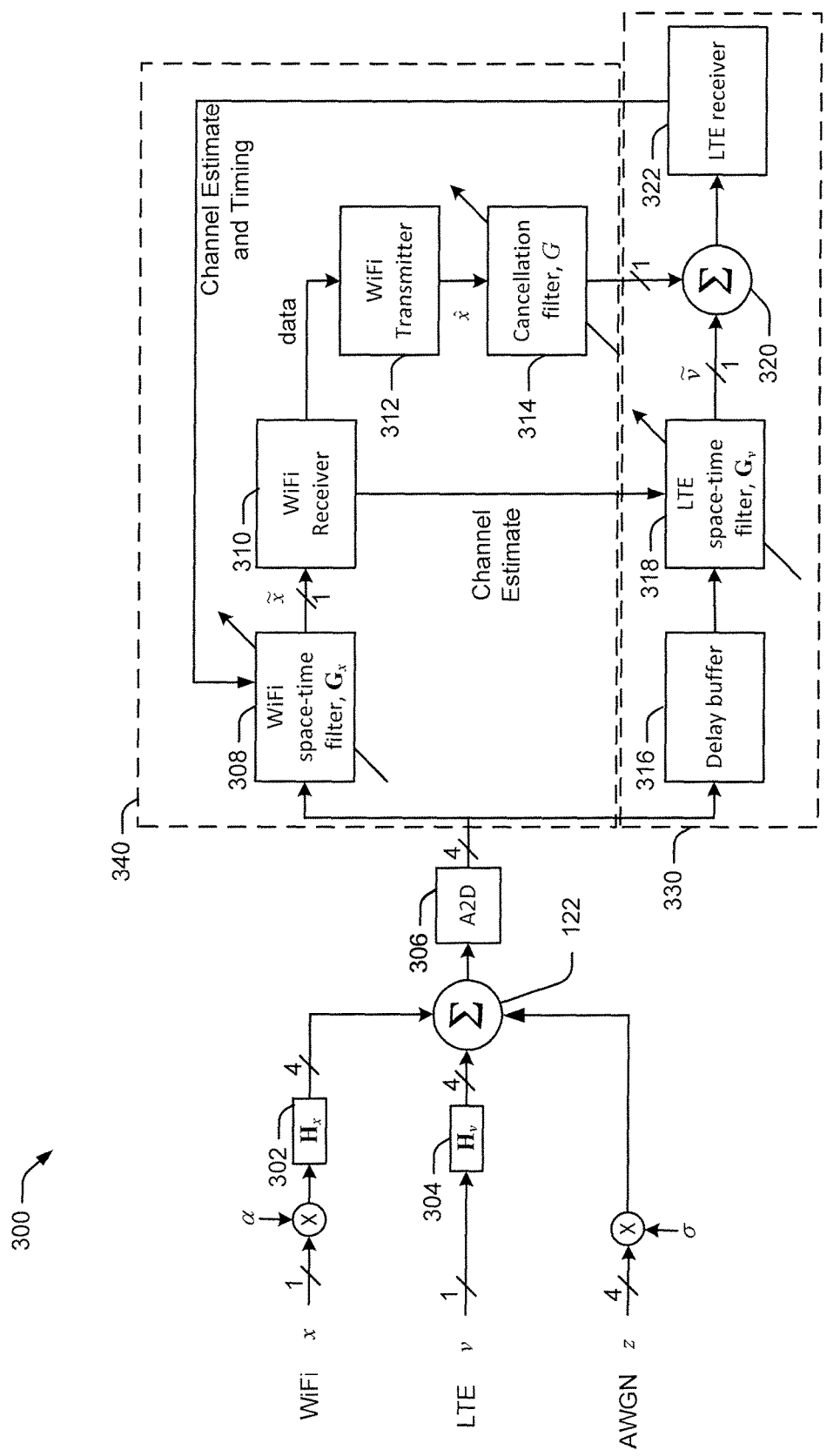
FIG. 3 is a diagram schematically illustrating a multi-modem component.

FIG. 3 is a diagram schematically illustrating a multi-modem component 300. The multi-modem component 300 may receive a combined signal including a Wi-Fi signal x, an LTE signal v, and noise z. The Wi-Fi signal x may travel through a channel $H_x$ 302. The LTE signal v may be a signal for LTE/LTE Advanced in unlicensed spectrum traveling through a channel $H_v$ 304. The signals may be combined as they travel over the air and are received at the antennas 124. The analog signals may be sampled by the A2D converter 306 to produce multiple input streams. For example, the A2D converter 306 may produce 4 input streams. The multiple input streams may then be directed to two processing paths: a first processing path 330 and a second processing path 340.

The first processing path 330 may process the input streams based on a first RAT type. For example, the first processing path 330 may process the input streams for LTE. The first processing path 330 may include a delay buffer 316, an LTE space-time filter, $G_v$ 318, a combiner 320, and an LTE receiver 322. The LTE receiver 322 may be configured to generate a channel estimate for an LTE channel $H_v$ 304 based on previously decoded signals. For example, the LTE signals may be decoded when there is no interference from Wi-Fi. Because the LTE channel $H_v$, may have a well defined frame structure, the channel estimate for the LTE channel $H_v$, 304 may not change significantly for at least the length of a sub-frame (e.g. 1 millisecond). Accordingly the LTE receiver 322 may provide the channel estimate to the second processing path 340 for use throughout the duration of the sub-frame.

The second processing path 340 may include a Wi-Fi space time filter, $G_x$ 308, a Wi-Fi receiver 310, a Wi-Fi transmitter 312, and a cancellation filter 314. In the second processing path 340, the input streams from the A2D converters 306 may be directed to a Wi-Fi space-time filter, $G_x$ 308. The Wi-Fi space-time filter, $G_x$ 308 may be a digital filter configured to improve the Wi-Fi signal x. In an aspect, the Wi-Fi space-time filter, $G_x$ 308 may enhance the Wi-Fi signal x by nulling the signal component in the direction of the LTE channel, $H_v$. In an aspect, for example, the Wi-Fi space-time filter, $G_x$ 308 may be configured based on a channel estimate of the channel $H_v$, provided by the LTE receiver 322. For example, the Wi-Fi space-time filter, $G_x$ 308 may be optimized when orthogonal to $H_v$ and parallel to $H_x$. Accordingly, the Wi-Fi space-time filter, $G_x$ 308 may be calculated according to the following expression:

$$G_x = \beta x (\sigma^2 I + H_v H_v^H)^{-1} H_x \quad (1)$$

$\beta_x$ may be an arbitrary complex scalar. $\sigma^2$ may denote an estimate of the power of the additive white Gaussian noise (AWGN), z, per antenna. I may denote the identity matrix. As discussed above $H_v$, may be a vector representation of the channel estimate for the LTE channel $H_v$ 304. $H_v^H$ may denote the Hermetian conjugate (complex transpose) of the channel estimate for the LTE channel. $H_x$ may denote a channel estimate of the Wi-Fi channel $H_x$ 302.

In an aspect, $\sigma^2 I$ may be replaced by a general noise-covariance matrix $\Lambda_n$, which may be any non-negative Hermitian matrix representing background noise. In an aspect, $H_x$ may be difficult to estimate because the channel coefficients for the Wi-Fi signal have not been determined yet. In this aspect, the Wi-Fi space-time filter, $G_x$ 308 may reduce the multiple input streams to a single stream $\tilde{x}$, which may be directed to the Wi-Fi receiver 310. If, on the other hand, the LTE channel $H_v$ is not known, then a single stream may be generated from the Wi-Fi channel $H_x$ using MRC.

In another aspect, the Wi-Fi space-time filter, $G_x$ 308 may be configured to null out the LTE signal without regard to the Wi-Fi channel. The Wi-Fi space-time filter, $G_x$ 308 may be configured using an orthogonal projection operator given by the following expression:

$$P=I-H_v(H_v^H H_v)^{-1}H_v^H P=I-H_v(H_v^H H_v)^{-1}H_v^H \quad (3)$$

P may be a square matrix ($n_{rx} \times n_{rx}$) In this aspect, the output of the Wi-Fi space-time filter, $G_x$ 308 may include multiple streams. That is, the Wi-Fi receiver 310 may be fed by, for example, four receive signals and not just one. The Wi-Fi space-time filter, $G_x$ 308 may reduce the number of input streams to three (for the case of one LTE spatial stream, more generally, to $n_{rx}-n_{ss}$), because the four input streams are linearly dependent. The projection operator, P, is Hermitian ($P=P^H$). Therefore, it has a Unitarian diagonalization. Furthermore, all the eigenvalues of P are either 0 or 1, because $P=P^2$. If the filter, $G_x$ 308 applies a Hermitian conjugate of a Unitarian matrix, $U^H$, after applying P, we are left with one (more generally, $n_{ss}$) stream of all zeroes, which may be eliminated. For example, if the bottom row(s) of $U^H$, are the ones with eigenvalue of zero, then they can be eliminated, and we are left with a 3 (or, $n_{rx}-n_{ss}$) dimensional output vector. In this aspect, multiple streams may be directed to the Wi-Fi receiver 310.

The Wi-Fi receiver 310 may be configured to demodulate and decode one or more received streams. If receiving multiple streams, the Wi-Fi receiver 310 may combine the streams using techniques known in the art. The Wi-Fi receiver 310 may produce demodulated data. The demodulated data may be directed to Wi-Fi transmitter 312. In an aspect, the Wi-Fi receiver 310 may also generate a Wi-Fi channel estimate for the incoming stream. The Wi-Fi channel estimate may be generated as the Wi-Fi signal is received. That is, the channel estimate generated by the Wi-Fi receiver 310 may be based on an actual received signal.

The Wi-Fi transmitter 312 may remodulate the demodulated data provided by the Wi-Fi receiver 310. The Wi-Fi transmitter 312 may produce a Wi-Fi signal $\hat{x}$ that may be similar to the originally transmitted Wi-Fi signal x. If the Wi-Fi signal x is decoded with no errors, the remodulated Wi-Fi signal $\hat{x}$ may be identical to the originally transmitted Wi-Fi signal x. The remodulated Wi-Fi signal $\hat{x}$ may be directed to the cancellation filter, G 314.

The cancellation filter, G 314 may be configured to cancel the remodulated Wi-Fi signal $\hat{x}$ from another signal. For example, the cancellation filter, G 314 may generate the inverse of the remodulated Wi-Fi signal $\hat{x}$ which may be combined with the other signal using a combiner 320. For example, the coefficients of the cancellation filter may be given by $G=-H_x^H \cdot G_v$.

Returning to the first processing path 330, the streams from the A2D converters 306 may be directed to a delay buffer 316. The delay buffer 316 may be a first-in-first-out (FIFO) buffer configured to temporarily store the incoming streams. In an aspect, the delay buffer 316 may be configured based on the processing time of the Wi-Fi processing path. For example, the delay buffer 316 may delay the incoming streams until the Wi-Fi receiver determines a channel estimate. As another example, the delay buffer 316 may delay the incoming streams until the Wi-Fi transmitter generates the remodulated signal z and the cancellation filter 314 is configured.

The LTE space-time filter, $G_v$ 318 may be a digital filter configured to maximize the LTE signal to interference and noise ratio (SINR). For example, the LTE space-time filter, $G_v$ 318 may be configured to null out a Wi-Fi channel. Because the combined signal is delayed by delay buffer 316, the channel estimate determined by the Wi-Fi receiver 310 may be used to configure the LTE space-time filter, $G_v$ 318. For example, the LTE space-time filter, $G_v$ 318 may be configured based on an orthogonal projection operation on the channel estimate. Accordingly, the LTE space-time filter, $G_v$ 318 may be calculated according to the following expression:

$$G_v = \beta_v (\sigma^2 I + H_x H_x^H)^{-1} H_v \quad (2)$$

$\beta_v$ may be another arbitrary complex scalar constant. $\sigma^2$ may denote an estimate of the power of the additive white Gaussian noise (AWGN), z, per antenna. I may denote the identity matrix. As discussed above, $\sigma^2 I$ may be replaced by a general noise-covariance matrix $\Lambda_n$, which may be any non-negative Hermitian matrix representing background noise. As discussed above $H_v$ may be a vector representation of the channel estimate for the LTE channel $H_v$ 304. $H_v^H$ may be the Hermetian conjugate (complex transpose) of the channel estimate for the LTE channel. $H_x$ may be a channel estimate of the Wi-Fi channel $H_x$ 302. Due to the delay buffer 316, the coefficients for $H_x$ may be known from Wi-Fi receiver 310.

In an aspect, the multi-modem component 300 may select between using the LTE space-time filter, $G_v$ 318 and the cancellation filter 314. For example, on the one hand, the cancellation filter 314 may be more effective when the Wi-Fi receiver is able to decode and demodulate the Wi-Fi signal with a low error rate such as a block error rate (BLER) or a packet error rate (PER). On the other hand, the LTE space-time filter, $G_v$ 318 may be more effective when the error rate for the Wi-Fi receiver 310 is high. Accordingly, the LTE space-time filter, $G_v$ 318 may be bypassed or may be configured to provide no filtering when cancellation filter 314 is selected.

The LTE space-time filter, $G_v$ 318 may reduce the multiple input streams to a single stream $\tilde{v}$, which may be directed to the combiner 320. At combiner 320, if interference cancellation is selected, the input stream $\tilde{v}$ may be combined with the output of the cancellation filter 314. The contribution of the Wi-Fi signal $\hat{x}$ may be subtracted or canceled from the combined signal, leaving the LTE signal $\tilde{v}$ and noise. The signal may then be directed to the LTE receiver 322.

The LTE receiver 322 may be configured to demodulate and decode a received signal. Because the interference from the Wi-Fi signal x has been reduced by either the LTE space-time filter, $G_v$ 318 or the cancellation filter 314, the incoming stream may have a higher SINR, and the LTE receiver 322 may be able to demodulate and decode the incoming stream with a lower error rate. The LTE receiver 322 may also generate a channel estimate and timing information. The channel estimate and timing information may be based on characteristics of the LTE signal carried in the decoded LTE signal. For example, the decoded LTE signal may include control and scheduling information that may be used to predict the future LTE signal.

Figure 4:
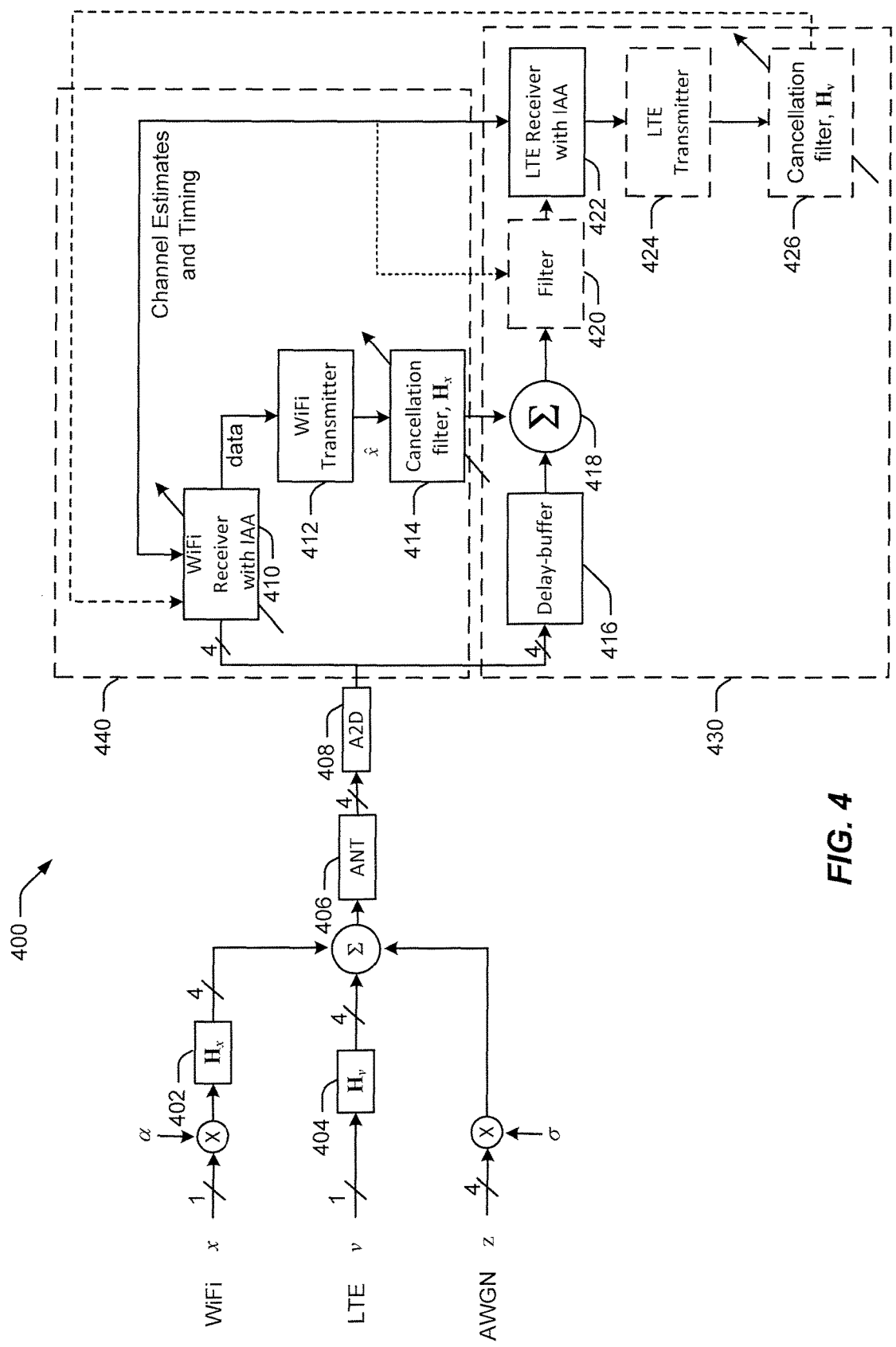
FIG. 4 is a diagram schematically illustrating another multi-modem component.

FIG. 4 is a diagram schematically illustrating a multi-modem component 400. The multi-modem component 400 may receive a combined signal including a WiFi signal x, a LTE signal v, and noise z. The WiFi signal x may travel through a channel $H_x$ 302. The LTE signal v may travel through a channel $H_v$ 304. The LTE signal v may be a signal for LTE/LTE Advanced in unlicensed spectrum. The signals may be combined as they travel over the air and are received at the antennas 406. The analog signals may be sampled by one or more A2D converters 408 to produce multiple input streams. For example, the A2D converters 408 may produce 4 input streams. The multi-modem component 400 may include two processing paths: a first processing path 430 and a second processing path 440. The first processing path 430 may include a delay buffer 416, combiner 418, filter 420, LTE receiver 422, LTE transmitter 424, and cancellation filter 426. Similar to the LTE receiver 322, the LTE receiver 422 may generate a channel estimate for the LTE channel $H_v$, 404 that may be applicable to future signals based on decoded information.

In the second processing path 440, the input streams from the A2D converters 408 may be directed to a Wi-Fi receiver 410. The Wi-Fi receiver 410 may be configured to perform interference aware methodologies to process the received input streams. In an aspect, an interference aware methodology may make use of properties of an interfering signal when decoding a desired signal.

In an aspect, an interference aware methodology based on maximal ratio combining (MRC) in a frequency domain may be used. Channel estimates for the Wi-Fi channel $H_x$ may be known once processing reaches the frequency domain. The Wi-Fi receiver 410 may be configured to use an equalizer with zero-forcing coefficients given by the following expression:

$$G_x = \Lambda^{-1} H_x (H_x^H \Lambda^{-1} H_x)^{-1} \quad (3)$$

$H_x$ may be a channel estimate of the Wi-Fi channel 402. $H_x^H$ may be the Hermetian conjugate (complex transpose) of the channel estimate for the Wi-Fi channel 402. Λ may be a noise covariance matrix based, at least in part, on the LTE channel 404, which may be accurately estimated by the LTE receiver 422. In an aspect, the noise covariance matrix Λ may be given by the following expression:

$$\Lambda = \sigma^2 I + H_v H_v^H \quad (4)$$

The equalization matrix may provide zero-forcing coefficients that reduce interference caused by the LTE signal. In other words, the zero-forcing coefficients may compensate for interference caused by the LTE signal.

In another aspect, an interference aware methodology based on maximal mean square estimation (MMSE) in the frequency domain may be used. An equalization matrix for MMSE may be determined according to the following expression:

$$G_x = \Lambda^{-1} H_x (H_x^H \Lambda^{-1} H_x + I)^{-1} = (H_x H_x^H + \Lambda)^{-1} H_x \quad (5)$$

$H_x$ may be a channel estimate of the Wi-Fi channel 402. $H_x^H$ may be the Hermetian conjugate (complex transpose) of the channel estimate for the Wi-Fi channel 402. Λ may be a noise covariance matrix determined based, at least in part, on the LTE channel 404 as above in expression (4).

In another aspect, an interference aware methodology may use maximum likelihood (ML) decoding as an equalization method. For example, ML decoding may include minimizing the metric $M_{ML}$ given by the following expression:

$$M_{ML} = (y - Hx)^H \Lambda^{-1} (y - Hx) \quad (6)$$

$H_x$ may be a channel estimate of the Wi-Fi channel 402. Λ may be a noise covariance matrix determined based, at least in part, on the LTE channel 404 as above in expression (4). The vector y may be the frequency domain received signal. In the case where Λ=I, the regular ML expression may be used.

The above described interference aware methodologies may effectively perform null-steering of the LTE signal within the Wi-Fi receiver 410.

The Wi-Fi transmitter 412 may be similar to the Wi-Fi transmitter 312. The Wi-Fi transmitter 412 may receive the decoded data from the Wi-Fi receiver 410 and remodulate the data to produce a Wi-Fi signal $\hat{x}$, which may be used to configure a cancellation filter 414, which may be similar to the cancellation filter 314.

Returning to the first processing path 430, the input streams from the A2D converters 408 may be directed to a delay buffer 416. In this aspect, no space-time filter is employed before the combiner 418. The delay buffer 416 may be configured to delay the input streams until the cancellation filter 414 is configured. The combiner 418 may subtract or cancel the Wi-Fi signal $\hat{x}$ component from the combined signal.

In an aspect, the multi-modem component 400 may optionally include a filter 420 after the cancellation filter 414 and combiner 418. The filter 420 may be a digital space-time filter configured based on one or both of the channel estimates $H_x$ provided by the Wi-Fi receiver 410 and $H_v$ provided by the LTE receiver 422. The filter 420 may further improve a SINR of the combined signal for the LTE receiver 422. In an aspect, the filter 420 may be selectively applied based on the error rate of the Wi-Fi receiver 410. Additional filtering by filter 420 may be more effective when the Wi-Fi receiver 410 has a higher error rate.

The LTE receiver 422 may also be configured to perform interference aware methodologies. Analogous expressions to expressions (3)-(6) may be obtained for the LTE receiver 422 by interchanging the x and v subscripts everywhere. As previously mentioned, the LTE receiver 422 may provide channel estimates for the LTE channel $H_v$. The LTE receiver 422 provides the LTE channel estimates, per subcarrier, needed by the Wi-Fi receiver 410, and vice-versa; the Wi-Fi receiver 410 supplies the Wi-Fi channel estimate, $H_x$, needed by the LTE receiver 422. In addition to channel estimates, the Wi-Fi receiver 410 also provides other valuable information to the LTE receiver 422. For example, after a Wi-Fi packet is detected and its preamble is processed, the Wi-Fi receiver 410 is able to report that there is interference. The Wi-Fi receiver 410 may report when the interference starts and when the interference is expected to end, and what frequency band the interference occupies.

In an aspect, the multi-modem component 400 may optionally include an LTE transmitter 424 and a cancellation filter 426 for joint iterative decoding. The LTE transmitter 424 may operate in a similar manner to the Wi-Fi transmitter 412 using demodulated and decoded data provided by the LTE receiver 422 to generate and remodulate an LTE signal $\hat{v}$ that is similar to the original LTE signal v. The remodulated LTE signal $\hat{v}$ may be used to configure the cancellation filter 426. The cancellation filter 426 may operate in a similar manner to the cancellation filter 414. However, due to timing issues including the effect of delay buffer 416, the cancellation filter 426 may be used to improve a Wi-Fi signal for subsequent decoding attempts. For example, the Wi-Fi receiver 410 may store the received input streams and subsequently attempt to improve the input streams by canceling the remodulated LTE signal $\hat{v}$ to produce a second remaining portion of the combined signal. The Wi-Fi receiver 410 may then decode the second remaining portion a second time. The subsequently decoded data may then be used to further improve cancellation filter 414 and improve the LTE signal. In an aspect, joint iterative decoding may be used when the Wi-Fi receiver 410 has a high error rate. Joint iterative decoding may be repeated until a threshold error rate is reached or the interference cancellation technique no longer improves the error rate.

Figure 5:
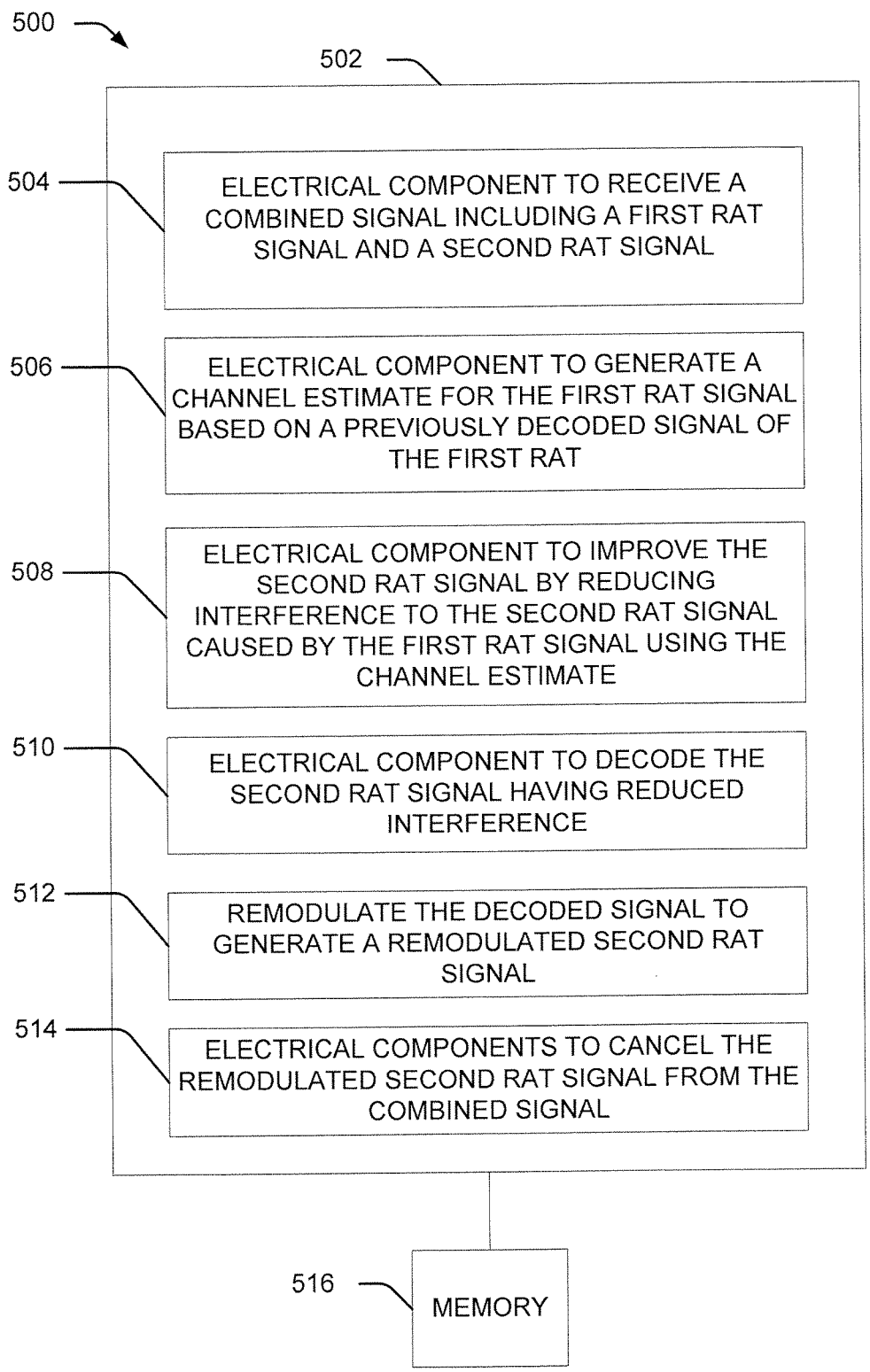
FIG. 5 is a block diagram illustrating aspects of a logical grouping of electrical components as contemplated by the present disclosure.

Referring to FIG. 5, an example system 500 for interference mitigation in unlicensed spectrum is illustrated. The system 500 may be included in an access terminal 102. Other wireless devices such as, for example, access terminal 104 and access points 106, 108 may also include a system 500 for interference mitigation in unlicensed spectrum. It is to be appreciated that system 500 is represented as including functional blocks, which can be functional blocks that represent functions implemented by a processor, software, or combination thereof (for example, firmware). System 500 includes a logical grouping 502 of electrical components that can act in conjunction. For instance, logical grouping 502 can include an electrical component 504 receiving a combined signal including a first RAT signal and a second RAT signal. In an aspect, electrical component 404 may comprise RF front-end 122 (FIG. 1).

Additionally, logical grouping 502 can include an electrical component 506 for generating, by a first RAT receiver in a first processing path, a channel estimate for the first RAT signal based on a previously decoded signal of the first RAT. In an aspect, the electrical component 506 may comprise receiver 142 (FIG. 1), receiver 322 (FIG. 3) or receiver 422 (FIG. 4).

Additionally, logical grouping 502 can include an electrical component 508 for reducing interference to the second RAT signal caused by the first RAT signal, in a second processing path, using the channel estimate. The electrical component 508 may comprise filter 136, receiver 132, Wi-Fi space-time filter, $G_x$ 308, or Wi-Fi receiver 410.

Additionally, logical grouping 502 can include an electrical component 510 for decoding the second RAT signal having reduced interference. The electrical component 510 may comprise receiver 132, Wi-Fi receiver 310, or Wi-Fi receiver 410.

Additionally, logical grouping 502 can include an electrical component 512 for remodulating the decoded signal to generate a remodulated second RAT signal. In an aspect, the electrical component 512 may comprise the Wi-Fi transmitter 312 or the Wi-Fi transmitter 412.

Additionally, logical grouping 502 can include electrical components 514 for cancelling the remodulated second RAT signal from the combined signal. In an aspect, the electrical component 510 may comprise cancellation filter 314 or cancellation filter 414. The electrical components 514 may further include a combiner 320 or combiner 418.

Additionally, system 500 can include a memory 516 that retains instructions for executing functions associated with the electrical components 504, 506, 508, 510, 512, and 514 stores data used or obtained by the electrical components 504, 506, 508, 510, 512, and 514. While shown as being external to memory 516, it is to be understood that one or more of the electrical components 504, 506, 508, 510, 512, and 514 can exist within memory 516. In one example, electrical components 504, 506, 508, 510, 512, and 514 can comprise at least one processor, or each electrical component 504, 506, 508, 510, 512, and 514 can be a corresponding module of at least one processor. Moreover, in an additional or alternative example, electrical components 504, 506, 508, 510, 512, and 514 can be a computer program product including a computer readable medium, where each electrical component 504, 506, 508, 510, 512, and 514 can be corresponding code.

Figure 6:
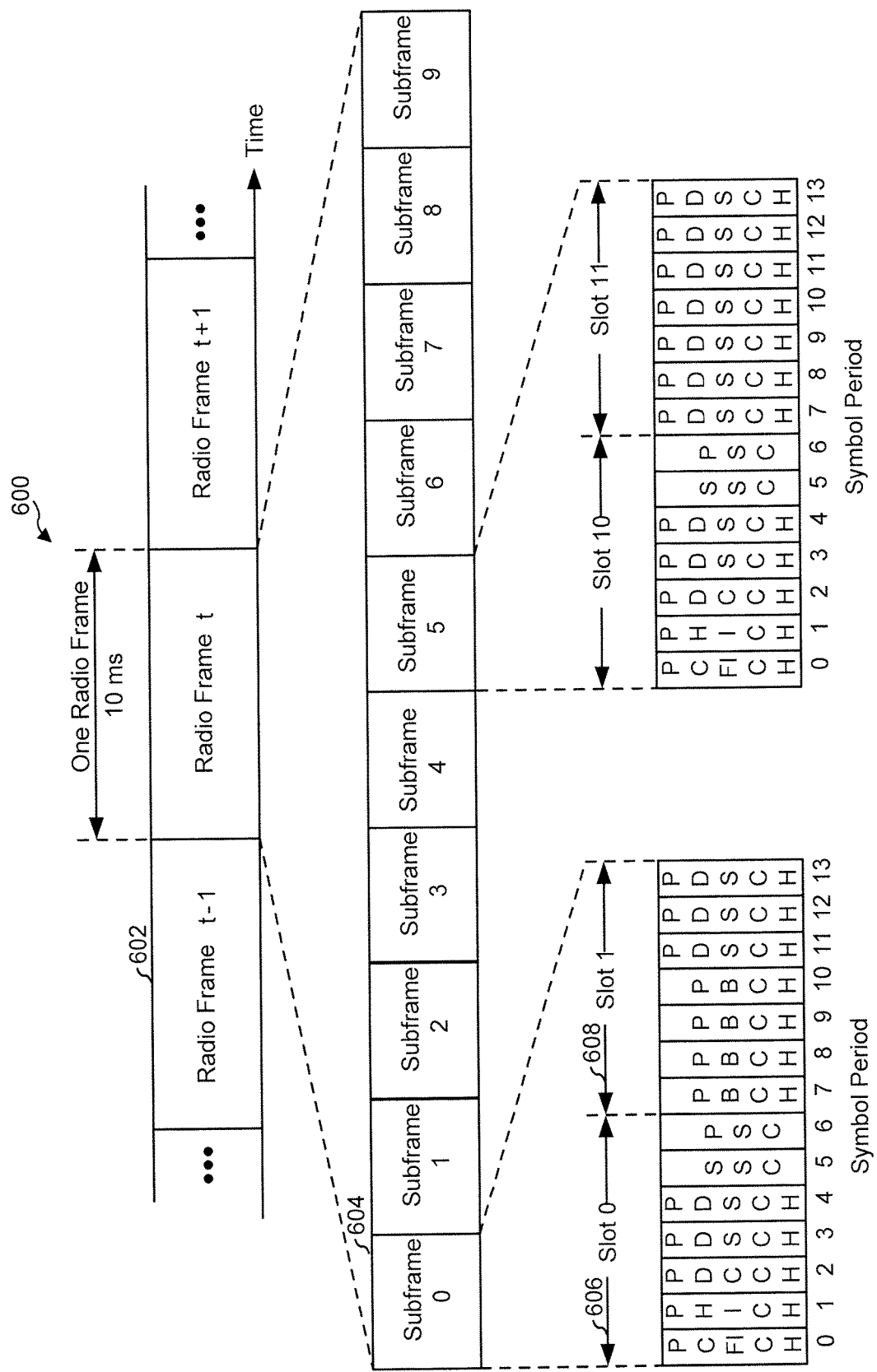
FIG. 6 is a block diagram conceptually illustrating an example of a downlink frame structure in a telecommunications system in accordance with an aspect of the present disclosure.

FIG. 6 is a block diagram conceptually illustrating an example of a downlink frame structure in a telecommunications system in accordance with an aspect of the present disclosure. The transmission timeline for the downlink may be partitioned into units of radio frames 602. Each radio frame 602 may have a predetermined duration (e.g., 10 milliseconds (ms)) and may be partitioned into 10 sub-frames 604 with indices of 0 through 9. Each sub-frame 604 may include two slots 606 and 608. Each radio frame may thus include 20 slots with indices of 0 through 19. Each slot may include L symbol periods, e.g., 7 symbol periods for a normal cyclic prefix (as shown in FIG. 6) or 14 symbol periods for an extended cyclic prefix (not shown). The 2L symbol periods in each sub-frame 604 may be assigned indices of 0 through 2L−1. The available time frequency resources may be partitioned into resource blocks. Each resource block may cover N subcarriers (e.g., 12 subcarriers) in one slot.

As discussed above, an LTE receiver (e.g. LTE receiver 134 in FIG. 1) may use a frame structure to provide a channel estimate. For example, an LTE receiver 134 may estimate an LTE channel based on a previously decoded LTE signal. In an aspect, the LTE receiver 134 may provide a constant channel estimate for the duration of an LTE sub-frame (e.g. 1 ms). Accordingly, a channel estimate for one symbol period may be based on a decoded LTE signal received in a previous symbol period. The channel estimate for that symbol period may then be used to reduce interference to, for example, a Wi-Fi signal received during the symbol period.

Figure 7:
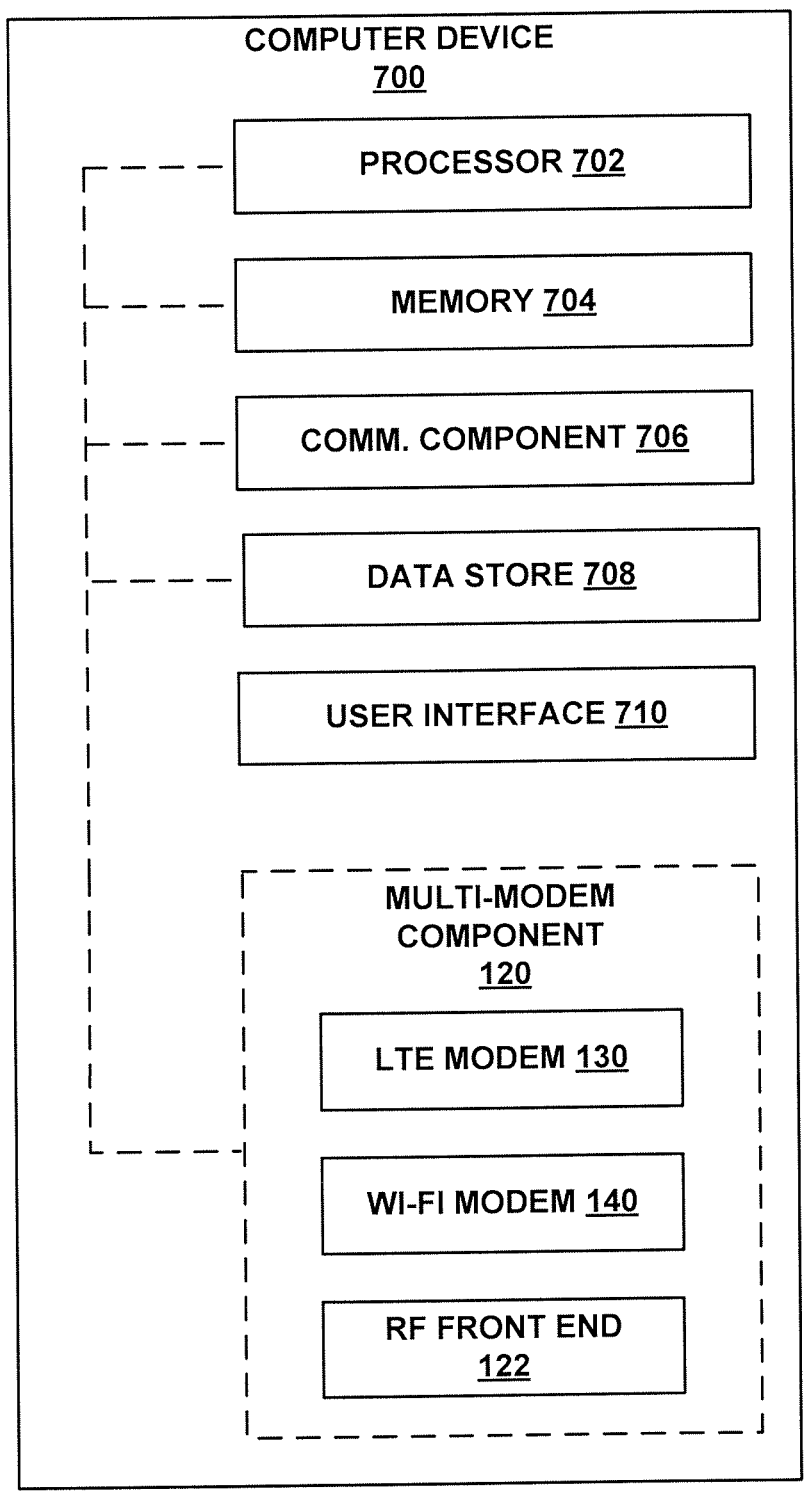
FIG. 7 is a block diagram illustrating aspects of a computer device according to the present disclosure.

Referring to FIG. 7, in one aspect, one or more of an access terminal 102 (FIG. 1) or access point 106 16 (FIG. 1) including multi-modem component 120 (FIG. 1) may be represented by a specially programmed or configured computer device 700. In one aspect of implementation, computer device 700 may include multi-modem component 120 (FIG. 1), such as in specially programmed computer readable instructions or code, firmware, hardware, or some combination thereof. Computer device 700 includes a processor 702 for carrying out processing functions associated with one or more of components and functions described herein. For example, processor 702 may implement one or more modems of the multi-modem component such as the LTE modem 130 and the Wi-Fi modem 140 Accordingly, the processor 702 may generate a channel estimate for the first RAT signal (e.g. an LTE signal) based on a previously decoded signal of the first RAT. Processor 702 may also reduce interference to the second RAT signal caused by the first RAT signal. Processor 702 can include a single or multiple set of processors or multi-core processors. Processor 702 may include multiple processing paths for concurrently performing processing of a signal for multiple RATs. Moreover, processor 702 can be implemented as an integrated processing system and/or a distributed processing system.

Computer device 700 further includes a memory 704, such as for storing data used herein and/or local versions of applications being executed by processor 702. Memory 704 can include any type of memory usable by a computer, such as random access memory (RAM), read only memory (ROM), tapes, magnetic discs, optical discs, volatile memory, non-volatile memory, and any combination thereof.

Further, computer device 700 includes a communications component 706 that provides for establishing and maintaining communications with one or more parties utilizing hardware, software, and services as described herein. Communications component 706 may carry communications between components on computer device 700, as well as between computer device 700 and external devices, such as devices located across a communications network and/or devices serially or locally connected to computer device 700. For example, communications component 706 may include one or more buses, and may further include transmit chain components and receive chain components associated with a transmitter and receiver, respectively, or a transceiver, operable for interfacing with external devices. In an aspect, the communications component 706 may implement part of the multi-modem component 120 such as the RF front-end 122. For example, the communications component may receive a combined signal including a first RAT signal and a second RAT signal. Additionally, receive chain components of the communications component 706 may be configured to perform processing functions of the multi-modem component 120. In an additional aspect, communications component 706 may be configured to receive one or more pages from one or more subscriber networks. In a further aspect, such a page may correspond to the second subscription and may be received via the first RAT communication services.

Additionally, computer device 700 may further include a data store 708, which can be any suitable combination of hardware and/or software, that provides for mass storage of information, databases, and programs employed in connection with aspects described herein. For example, data store 708 may be a data repository for applications not currently being executed by processor 702.

Computer device 700 may additionally include a user interface component 710 operable to receive inputs from a user of computer device 700 and further operable to generate outputs for presentation to the user. User interface component 710 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 710 may include one or more output devices, including but not limited to a display, a speaker, a haptic feedback mechanism, a printer, any other mechanism capable of presenting an output to a user, or any combination thereof.

Figure 8:
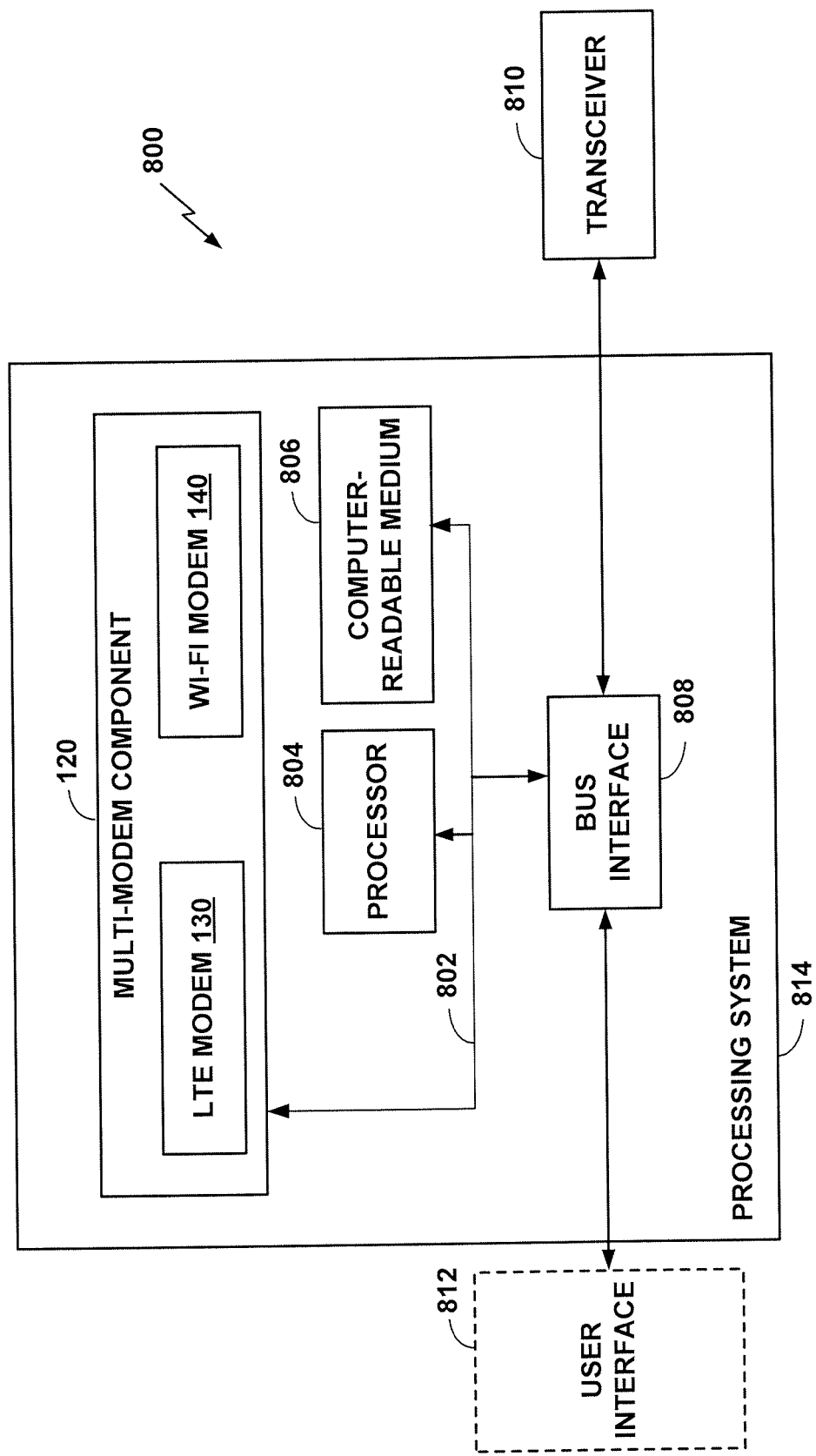
FIG. 8 is a block diagram illustrating an example of a hardware implementation for an apparatus employing a processing system.

FIG. 8 is a block diagram illustrating an example of a hardware implementation for an apparatus 800, for example, including the multi-modem component 120 (FIG. 1) and employing a processing system 814 for carrying out aspects of the present disclosure, such as interference mitigation in shared spectrum. In this example, the processing system 814 may be implemented with bus architecture, represented generally by a bus 802. The bus 802 may include any number of interconnecting buses and bridges depending on the specific application of the processing system 814 and the overall design constraints. The bus 802 links together various circuits including one or more processors, represented generally by the processor 804, computer-readable media, represented generally by the computer-readable medium 806, and one or more components described herein, such as, but not limited to, multi-modem component 120 (FIG. 1). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a means for communicating with various other apparatus over a transmission medium. In an aspect, the transceiver 810 may implement the RF front-end 122 (FIG. 1). Accordingly, the transceiver 810 may receive a combined signal including a first RAT signal and a second RAT signal. The transceiver 810 may provide the combined signal to the multi-modem component 120 via the bus interface 808. Depending upon the nature of the apparatus, a user interface 812 (e.g., keypad, display, speaker, microphone, joystick) may also be provided.

The processor 804 is responsible for managing the bus 802 and general processing, including the execution of software stored on the computer-readable medium 806. The software, when executed by the processor 804, causes the processing system 814 to perform the various functions described infra for any particular apparatus. The computer-readable medium 807 may also be used for storing data that is manipulated by the processor 804 when executing software. Multi-modem component 120 as described above may be implemented in whole or in part by processor 804, or by computer-readable medium 806, or by any combination of processor 804 and computer-readable medium 806. For example, the computer-readable medium 806 may include code executable by the processor 804 for causing the transceiver 810 to receive a combined signal including a first RAT signal and a second RAT signal. In an aspect, the LTE modem may be implemented, in part, by code stored on the computer-readable medium 806 for generating a channel estimate for the first RAT signal based on a previously decoded signal of the first RAT. In an aspect, the Wi-Fi modem 140 may be implemented, in part, by code stored on the computer-readable medium 806 for reducing interference to the second RAT signal caused by the first RAT signal using the channel estimate.

Figure 9:
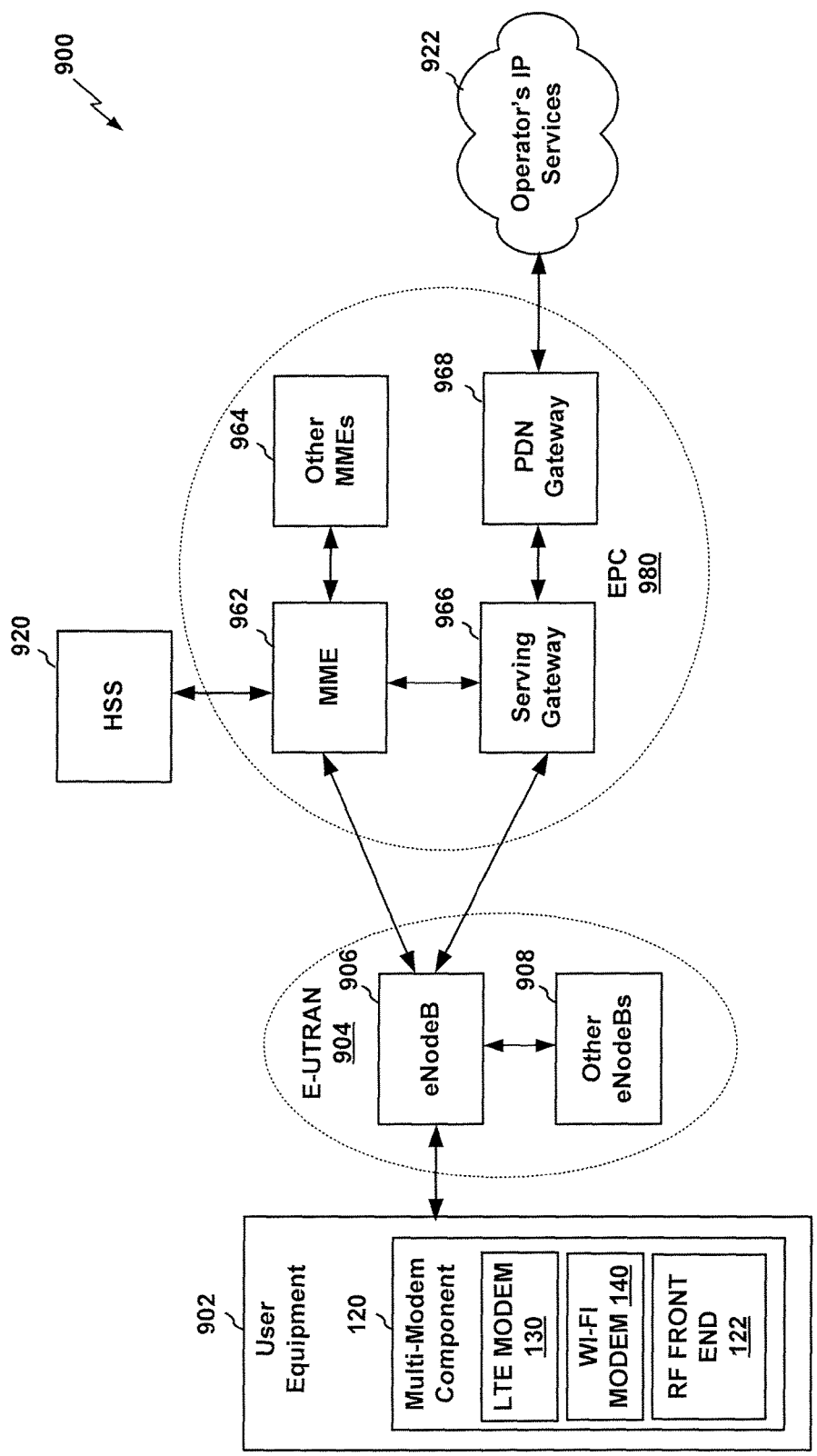
FIG. 9 is a block diagram conceptually illustrating an example of a telecommunications system.

FIG. 9 is a diagram illustrating a long term evolution (LTE) network architecture 900 employing various apparatuses of communications system 100 (FIG. 1) and may include one or more access terminals 102 (FIG. 1) or access points 106 (FIG. 1). The LTE network architecture 900 may operate in parallel to a network employing Wi-Fi (not shown). A network employing Wi-Fi may use a Wi-Fi protocol for a connection between an access terminal and an access point, but may use different architectures for a backhaul to an operator's network. The LTE network architecture 900 may be referred to as an Evolved Packet System (EPS) 900. EPS 900 may include one or more user equipment (UE) 902, an Evolved UMTS Terrestrial Radio Access Network (E-UTRAN) 904, an Evolved Packet Core (EPC) 980, a Home Subscriber Server (HSS) 920, and an Operator's IP Services 922. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 906 and other eNBs 908. The eNB 906 and 908 may each be an example of an access point 106 (FIG. 1) including a multi-modem component 120 for mitigating interference. For example, the eNB 906 may mitigate interference to LTE signals transmitted by the UE 902 caused by a Wi-Fi transmitter (not shown). The eNB 906 provides user and control plane protocol terminations toward the UE 902. The eNB 908 may be connected to the other eNBs 908 via an X2 interface (i.e., backhaul). The eNB 906 may also be referred to by those skilled in the art as a base station, a base transceiver station, a radio base station, a radio transceiver, a transceiver function, a basic service set (BSS), a small cell, an extended service set (ESS), or some other suitable terminology. The eNB 906 provides an access point to the EPC 980 for a UE 902, which may also include a multi-modem component 120 for mitigating interference to LTE signals transmitted by the eNodeB 906 or eNodeB 908. In another aspect, the UE 902 may also communicate using Wi-Fi and may use the multi-modem component 120 to mitigate interference caused by the LTE signals to the Wi-Fi signals. For example, the RF front-end 122 may receive a combined signal including an LTE signal and Wi-Fi signal. The LTE modem 130 may generate a channel estimate for the LTE signal based on a previously decoded LTE signal. The Wi-Fi modem may reduce interference to the Wi-Fi signal caused by the LTE signal using the channel estimate. Examples of UEs 902 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 902 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 906 is connected by an S1 interface to the EPC 980. The EPC 980 includes a Mobility Management Entity (MME) 962, other MMEs 964, a Serving Gateway 966, and a Packet Data Network (PDN) Gateway 968. The MME 962 is the control node that processes the signaling between the UE 902 and the EPC 980. Generally, the MME 962 provides bearer and connection management. All user IP packets are transferred through the Serving Gateway 966, which itself is connected to the PDN Gateway 968. The PDN Gateway 968 provides UE IP address allocation as well as other functions. The PDN Gateway 968 is connected to the Operator's IP Services 922. The Operator's IP Services 922 includes the Internet, the Intranet, an IP Multimedia Subsystem (IMS), and a PS Streaming Service (PSS).

Figure 10:
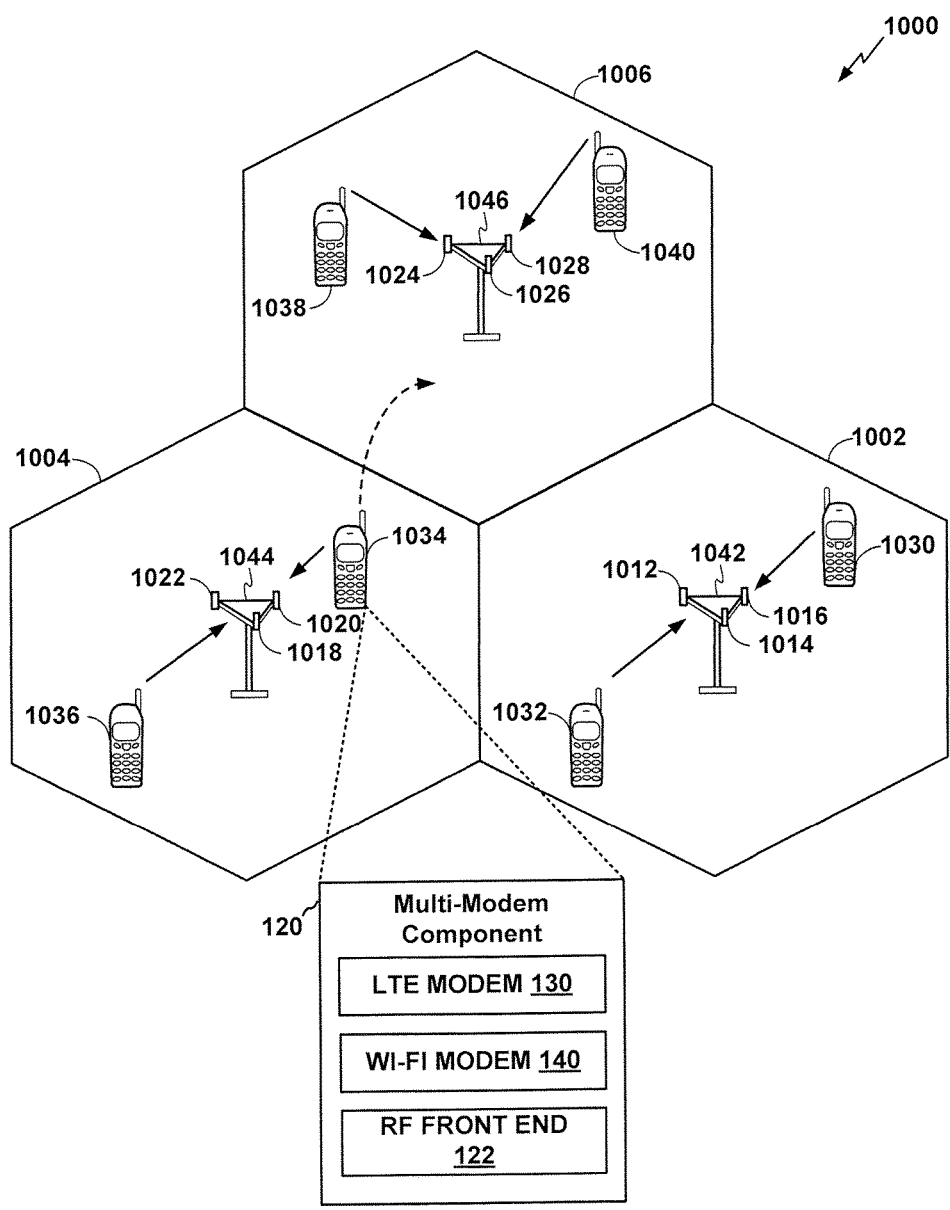
FIG. 10 is a conceptual diagram illustrating an example of an access network.

Referring to FIG. 10, an access network 1000 in a EUTRAN architecture is illustrated, and may include one or more access points 106 (FIG. 1), which may be base stations or small cell nodes. The multiple access wireless communication system includes multiple cellular regions (cells), including cells 1002, 1004, and 1006, each of which may include one or more sectors. The multiple sectors can be formed by groups of antennas with each antenna responsible for communication with UEs in a portion of the cell. For example, in cell 1002, antenna groups 1012, 1014, and 1016 may each correspond to a different sector. In cell 1004, antenna groups 1019, 1020, and 1022 each correspond to a different sector. In cell 1006, antenna groups 1024, 1026, and 1028 each correspond to a different sector. The cells 1002, 1004 and 1006 may include several wireless communication devices, e.g., UEs, for example, including access terminals 102 and 104 of FIG. 1, which may be in communication with one or more sectors of each cell 1002, 1004 or 1006. For example, UEs 1030 and 1032 may be in communication with eNodeB 1042, UEs 1034 and 1036 may be in communication with eNodeB 1044, and UEs 1039 and 1040 can be in communication with eNodeB 1046. Here, each eNodeB 1042, 1044, 1046 is configured to provide an access point for all the UEs 1030, 1032, 1034, 1036, 1038, 1040 in the respective cells 1002, 1004, and 1006. Additionally, each of UEs 1030, 1032, 1034, 1036, 1038, 1040 may be an example of access terminal 102 of FIG. 1 and may include a multi-modem component 120 for mitigating interference as described herein. For example, a multi-modem component 120 of the UE 1034 may mitigate interference caused to a signal transmitted by the eNodeB 1044 by a Wi-Fi access point (not shown) or another UE (e.g. UE 1036) acting as a Wi-Fi access terminal. Additionally, if the UE 1034 is simultaneously in communication with a Wi-Fi access point, the multi-modem component 120 may reduce interference to the Wi-Fi signal. For example, the RF front-end 122 may receive a combined signal including a LTE signal and a Wi-Fi signal. The LTE modem 130 may generate a channel estimate for the LTE signal based on a previously decoded LTE signal. The Wi-Fi modem 140 may reduce interference to the Wi-Fi signal caused by the LTE signal using the channel estimate.

As the UE 1034 moves from the illustrated location in cell 1004 into cell 1006, a serving cell change (SCC) or handover may occur in which communication with the UE 1034 transitions from the cell 1004, which may be referred to as the source cell, to cell 1006, which may be referred to as the target cell. Management of the handover procedure may take place at the UE 1034, at the eNodeBs corresponding to the respective cells, at EPC 980 (FIG. 9), or at another suitable node in the wireless network. For example, during a call with the source cell 1004, or at any other time, the UE 1034 may monitor various parameters of the source cell 1004 as well as various parameters of neighboring cells such as cells 1006 and 1002. During this time, the UE 1034 may maintain an Active Set, that is, a list of cells that the UE 1034 is simultaneously monitoring for possible SCC.

Further, the modulation and multiple access scheme employed by the access network 1000 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 11:
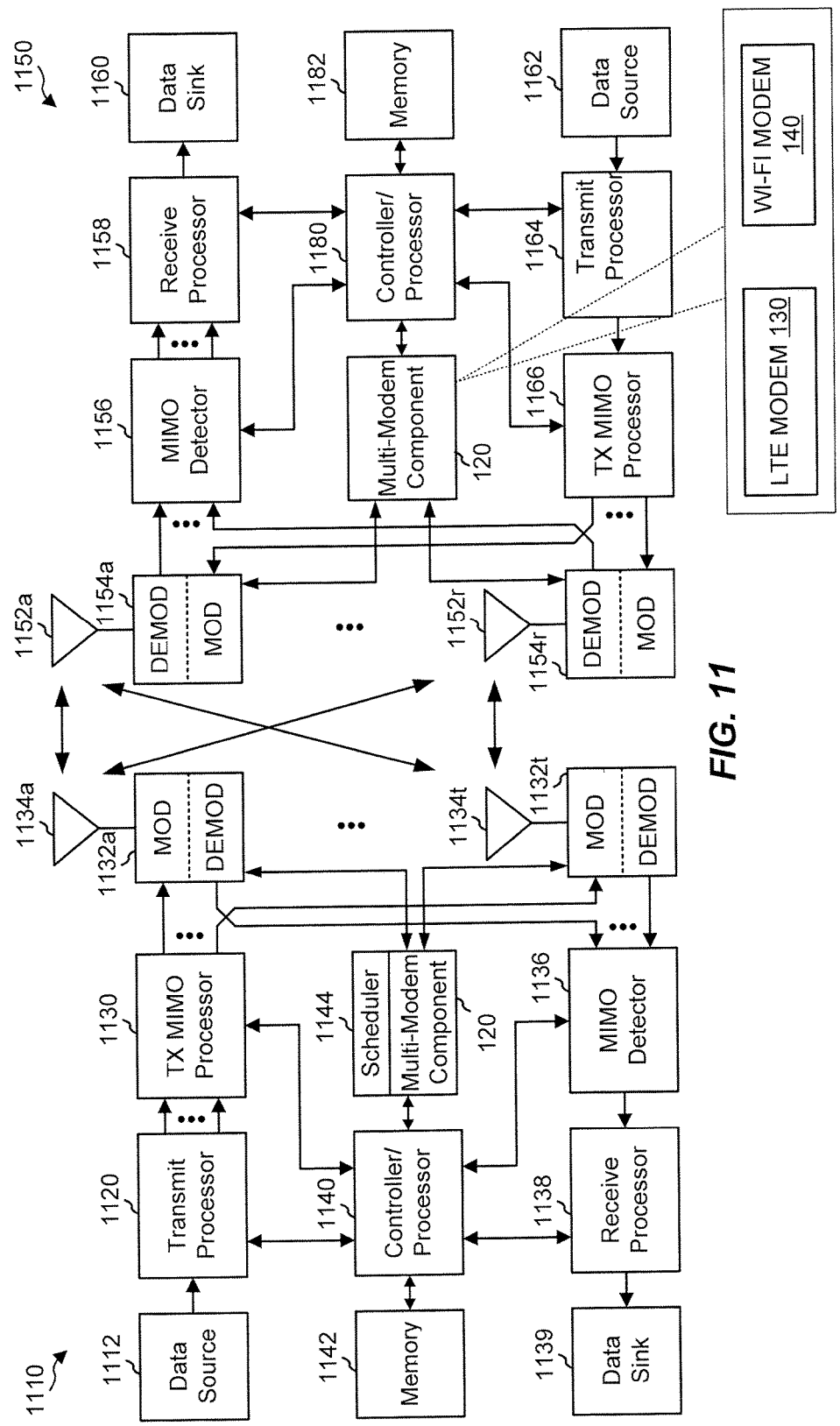
FIG. 11 is a block diagram conceptually illustrating an example of a NodeB in communication with a UE in a telecommunications system.

FIG. 11 is a block diagram conceptually illustrating an exemplary eNodeB 1110 and an exemplary UE 1120 configured in accordance with an aspect of the present disclosure. For example, the UE 1150, as shown in FIG. 11, may be one of the access terminals 102, 104 having a multi-modem component 120. For example, the eNodeB 1110, as shown in FIG. 11, may be one of the access points 106 having a multi-modem component 120. The eNodeB 1110 may be equipped with antennas $1134_{1-t}$, and the UE 1150 may be equipped with antennas $1152_{1-r}$, wherein t and r are integers greater than or equal to one.

The base station controller/processor 1140 and the UE controller/processor 1180 may direct the operation at the eNodeB 1110 and the UE 1150, respectively. The base station controller/processor 1140 and/or other processors and modules at the eNodeB 1110 may perform or direct, e.g., the execution of various processes for the techniques described herein. The UE controller/processor 1180 and/or other processors and modules at the UE 1150 may also perform or direct, e.g., the execution of the functional blocks illustrated in FIGS. 2, 3, and 4 and/or other processes for the techniques described herein. The base station memory 1142 and the UE memory 1182 may store data and program codes for the eNodeB 1110 and the UE 1150, respectively. A scheduler 1144 may schedule UEs 1150 for data transmission on the downlink and/or uplink. The multi-modem component 120 at the eNodeB 1110 may further include or be implemented by the modulators/demodulators 1132, receive processor 1138, controller/processor 1140, memory 1142, transmit processor 1120, and/or modulators/demodulators 1132. The multi-modem component 120 may further include similar components for a second RAT such as Wi-FI. In another aspect, the UE 1150 may also include a multi-modem component 120. The multi-modem component 120 at the UE 1150 may further include or be implemented by the modulators/demodulators 1154, reception processor 1158, controller/processor 1186, transmit processor 1164, and Tx MIMO processor 1166. The multi-modem component 120 may further include similar components for a second RAT such as Wi-Fi.

At the eNodeB 1110, a base station transmit processor 1120 may receive data from a base station data source 1112 and control information from a base station controller/processor 1140. The control information may be carried on the PBCH, PCFICH, PHICH, PDCCH, etc. The data may be carried on the PDSCH, etc. The base station transmit processor 1120 may process (e.g., encode and symbol map) the data and control information to obtain data symbols and control symbols, respectively. The base station transmit processor 1120 may also generate reference symbols, e.g., for the PSS, SSS, and cell-specific reference signal (RS). A base station transmit (TX) multiple-input multiple-output (MIMO) processor 1130 may perform spatial processing (e.g., precoding) on the data symbols, the control symbols, and/or the reference symbols, if applicable, and may provide output symbol streams to the base station modulators/demodulators (MODs/DEMODs) $1132_{1-t}$. Each base station modulator/demodulator 1132 may process a respective output symbol stream (e.g., for OFDM, etc.) to obtain an output sample stream. Each base station modulator/demodulator 1132 may further process (e.g., convert to analog, amplify, filter, and upconvert) the output sample stream to obtain a downlink signal. Downlink signals from modulators/demodulators $1132_{1-t}$ may be transmitted via the antennas $1134_{1-t}$, respectively.

At the UE 1150, the UE antennas $1152_{1-r}$ may receive the downlink signals from the eNodeB 1110 and may provide received signals to the UE modulators/demodulators (MODs/DEMODs) $1154_{1-r}$, respectively. Each UE modulator/demodulator 1154 may condition (e.g., filter, amplify, downconvert, and digitize) a respective received signal to obtain input samples. Each UE modulator/demodulator 1154 may further process the input samples (e.g., for OFDM, etc.) to obtain received symbols. In an aspect, the antennas $1152_{1-r}$ and (MODs/DEMODs) $1154_{1-r}$ may implement the RF front-end 122 (FIG. 1). In an aspect, the received symbols may be provided to the multi-modem component 120 to mitigate interference caused by the LTE signal to a second RAT. For example, the LTE modem 130 may generate a channel estimate for the LTE signal based on a previously received symbol. The Wi-Fi modem 140 may use the channel estimate to reduce interference to the Wi-Fi signal caused by the LTE signal. A UE MIMO detector 1156 may obtain received symbols from all the UE modulators/demodulators $1154_{1-r}$, and perform MIMO detection on the received symbols if applicable, and provide detected symbols. A UE reception processor 1158 may process (e.g., demodulate, deinterleave, and decode) the detected symbols, provide decoded data for the UE 1150 to a UE data sink 1160, and provide decoded control information to a UE controller/processor 1180. In an aspect, the UE reception processor 1158 may implement the LTE modem 130 in a first processing path and implement the Wi-Fi modem 140 in a second processing path.

On the uplink, at the UE 1150, a UE transmit processor 1164 may receive and process data (e.g., for the PUSCH) from a UE data source 1162 and control information (e.g., for the PUCCH) from the UE controller/processor 1180. The UE transmit processor 1164 may also generate reference symbols for a reference signal. The symbols from the UE transmit processor 1164 may be precoded by a UE TX MIMO processor 1166 if applicable, further processed by the UE modulator/demodulators $1154_{1-r}$ (e.g., for SC-FDM, etc.), and transmitted to the eNodeB 1110. At the eNodeB 1110, the uplink signals from the UE 1150 may be received by the base station antennas 1134, processed by the base station modulators/demodulators 1132, detected by a base station MIMO detector 1136 if applicable, and further processed by a base station reception processor 1138 to obtain decoded data and control information sent by the UE 1150. The base station reception processor 1138 may provide the decoded data to a base station data sink 1146 and the decoded control information to the base station controller/processor 1140. When the eNodeB 1110 also communicates using a second RAT, the modulators/demodulators 1132 may implement an RF front-end 122 that receives a combined signal including an LTE signal and a second RAT signal. The multi-modem component 120 at the eNodeB 1110 may generate a channel estimate for the first RAT signal based on a previously decoded LTE signal, for example, stored decoded data. The multi-modem component 120 may use the channel estimate to reduce interference to the second RAT signal. In an aspect, the multi-modem component 120, after decoding and remodulating the second RAT signal, may cancel the second RAT signal from the LTE signal to improve decoding of the LTE signal.

Several aspects of a telecommunications system have been presented with reference to an LTE system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer.

The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for interference mitigation for wireless signals, the method comprising:
   receiving a combined signal including a first radio access technology (RAT) signal and a second RAT signal;
   generating, by a first RAT receiver in a first processing path, a channel estimate for the first RAT signal based on a previously decoded signal of the first RAT;
   reducing interference to the second RAT signal caused by the first RAT signal, in a second processing path, using the channel estimate;
   decoding, by a second RAT receiver in the second processing path, the second RAT signal after reducing the interference caused by the first RAT signal;
   remodulating, by a second RAT transmitter, the decoded second RAT signal to generate a remodulated second RAT signal;
   canceling the remodulated second RAT signal from the combined signal to generate a remaining portion including the first RAT signal; and
   decoding, by the first RAT receiver, the remaining portion.

2. The method of claim 1, wherein the first RAT signal is a long-term evolution (LTE) signal in unlicensed spectrum and the second RAT signal is a Wi-Fi signal in unlicensed spectrum.

3. The method of claim 1, wherein reducing interference to the second RAT signal includes:
   configuring a space-time filter in the second processing path based on the channel estimate; and
   filtering a plurality of streams of the combined signal to null the first RAT signal.

4. The method of claim 3, wherein the space-time filter is configured based on an orthogonal projection operation on the channel estimate.

5. The method of claim 1, wherein reducing interference to the second RAT signal includes: weighting each stream of a plurality of streams of the combined signal using a covariance matrix based on the channel estimate; and combining, by a second RAT receiver in the second processing path, the plurality of streams using the weighting.

6. The method of claim 5, wherein weighting each stream of the plurality of streams of the combined signal includes determining zero-forcing coefficients using the covariance matrix, the zero-forcing coefficients weighting respective streams of the plurality of streams for a maximal ratio combining equalizer.

7. The method of claim 5, wherein weighting each stream of the plurality of streams of the combined signal includes generating an equalization matrix using the covariance matrix, the equalization matrix weighting each stream of the plurality of streams for minimum mean square error combining.

8. The method of claim 5, wherein weighting each stream of the plurality of streams of the combined signal includes minimizing a maximum likelihood metric based on the covariance matrix, a channel estimate of the second RAT signal, and the plurality of streams of the combined signal.

9. The method of claim 1, further comprising delaying the combined signal from entering the first RAT receiver until the remodulated second RAT signal is canceled from the combined signal.

10. The method of claim 1, further comprising:
    generating, by the second RAT receiver, a second channel estimate for the second RAT signal; and
    filtering, in the first processing path, the remaining portion of the combined signal based on the second channel estimate prior to decoding, the remaining portion of the combined signal.

11. The method of claim 1, further comprising:
    remodulating, by a first RAT transmitter, the decoded first RAT signal to generate a remodulated first RAT signal;
    canceling, in the second processing path, the remodulated first RAT signal from the combined signal; and
    decoding, by the second receiver, a second remaining portion of the combined signal including a portion of the second RAT signal.

12. The method of claim 1, wherein the channel estimate includes timing information for the first RAT signal.

13. An apparatus for interference mitigation for wireless signals, the apparatus comprising:
    means for receiving a combined signal including a first radio access technology (RAT) signal and a second RAT signal;

means for generating, in a first processing path, a channel estimate for the first RAT signal based on a previously decoded signal of the first RAT;

means for reducing, in a second processing path, interference to the second RAT signal caused by the first RAT signal using the channel estimate;

means for decoding, in the second processing path, the second RAT signal after reducing the interference caused by the first RAT signal;

means for remodulating the decoded second RAT signal to generate a remodulated second RAT signal;

means for canceling the remodulated second RAT signal from the combined signal in the first processing path to generate a remaining portion including the first RAT signal; and means for decoding the remaining portion.

14. The apparatus of claim 13, wherein the means for reducing interference to the second RAT signal include a space-time filter in the second processing path configured based on the channel estimate to filter a plurality of streams of the combined signal to null the first RAT signal.

15. The apparatus of claim 13, wherein the means for reducing interference to the second RAT signal are configured to:

weight each stream of a plurality of streams of the combined signal using a covariance matrix based on the channel estimate; and combine the plurality of streams using the weighting.

16. The apparatus of claim 13, further comprising:

means for remodulating, by a first RAT transmitter, the decoded first RAT signal to generate a remodulated first RAT signal;

means for canceling the remodulated first RAT signal from the combined signal;

means for decoding a second remaining portion of the combined signal including a portion of the second RAT signal; and means for decoding the second remaining portion of the combined signal.

17. An apparatus for interference mitigation for wireless signals comprising:

a radio front-end configured to receive a combined signal including a first radio access technology (RAT) signal and a second RAT signal;

a first RAT receiver, in a first processing path, configured to generate a channel estimate for the first RAT signal based on a previously decoded signal of the first RAT;

a second RAT receiver, in a second processing path, configured to use the channel estimate to improve the second RAT signal by reducing interference caused by the first RAT signal to the second RAT signal;

a second RAT transmitter configured to remodulate, a decoded second RAT signal produced by the second RAT receiver to generate a remodulated second RAT signal; and a cancellation filter configured to cancel the remodulated first RAT signal from the combined signal to generate a remaining portion including the first RAT signal, wherein the first RAT receiver is configured to decode the remaining portion.

18. The apparatus of claim 17, further comprising a delay buffer, in the first processing path, configured to delay the combined signal from entering the first RAT receiver until the remodulated second RAT signal is canceled from the combined signal.

19. The apparatus of claim 17, wherein the second RAT receiver is further configured to generate a second channel estimate for the second RAT signal, the apparatus further comprising a filter located in the first processing path prior to the first RAT receiver configured to filter the remaining portion of the combined signal based on the second channel estimate.

20. The apparatus of claim 17, further comprising:

a first RAT transmitter configured to remodulate the decoded first RAT signal to generate a remodulated first RAT signal; and a second cancellation filter configured to cancel the remodulated first RAT signal from the combined signal, wherein the second RAT receiver is configured to decode a second remaining portion of the combined signal including a portion of the second RAT signal.

21. The apparatus of claim 17, wherein the first RAT receiver and the second RAT receiver are co-located on a single silicon die.

22. The apparatus of claim 17, wherein the second receiver includes a space-time filter configured based on the channel estimate to null the first RAT signal.

23. The apparatus of claim 17, wherein the second receiver is configured to weight each stream of a plurality of streams of the combined signal using a covariance matrix based on the channel estimate and combine the plurality of streams using the weights.

24. The apparatus of claim 23, wherein the second receiver is configured to weight each stream of the plurality of streams of the combined signal by determining zero-forcing coefficients using the covariance matrix, the zero-forcing coefficients weighting respective streams of the plurality of streams for a maximal ratio combining equalizer.

25. The apparatus of claim 23, wherein the second receiver is configured to weight each stream of the plurality of streams of the combined signal by generating an equalization matrix using the covariance matrix, the equalization matrix weighting each stream of the plurality of streams for minimum mean square error combining.

26. The apparatus of claim 23, wherein the second receiver is configured to weight each stream of the plurality of streams of the combined signal by minimizing a maximum likelihood metric based on the covariance matrix, a channel estimate of the second RAT signal, and the plurality of streams of the combined signal.

27. A non-transitory computer readable medium storing computer executable code for interference mitigation for wireless signals, comprising instructions for:

receiving a combined signal including a first radio access technology (RAT) signal and a second RAT signal;

decoding, by a second RAT receiver in a second processing path, the second RAT signal;

remodulating, by a second RAT transmitter, the decoded second RAT signal to generate a remodulated second RAT signal;

canceling the remodulated second RAT signal from the combined signal to generate a remaining portion including the first RAT signal; and decoding, by a first RAT receiver in a first processing path, the remaining portion.

28. The non-transitory computer-readable medium of claim 27, further comprising instructions for:

generating, by the first RAT receiver, a channel estimate for the first RAT signal based on a previously decoded signal of the first RAT; and reducing interference to the second RAT signal caused by the first RAT signal using the channel estimate in the second processing path prior to the decoding the second RAT signal.

* * * * *